US012626358B2

(12) United States Patent
Mullaney

(10) Patent No.: US 12,626,358 B2
(45) Date of Patent: May 12, 2026

(54) METHODS AND SYSTEMS FOR DETERMINING ADJUSTMENT PRESCRIPTIONS OF EXTERNAL FIXATION DEVICES

(71) Applicant: Arthrex, Inc., Naples, FL (US)

(72) Inventor: Michael Mullaney, Naples, FL (US)

(73) Assignee: Arthrex, Inc., Naples, FL (US)

( * ) Notice: Subject to any disclaimer, the term of this patent is extended or adjusted under 35 U.S.C. 154(b) by 1391 days.

(21) Appl. No.: 16/793,696

(22) Filed: Feb. 18, 2020

(65) Prior Publication Data

US 2020/0253640 A1      Aug. 13, 2020

Related U.S. Application Data

(63) Continuation of application No. PCT/US2018/047880, filed on Aug. 24, 2018.
(Continued)

(51) Int. Cl.
    *G06T 7/00*        (2017.01)
    *G06T 7/73*        (2017.01)

(52) U.S. Cl.
    CPC ............. *G06T 7/0012* (2013.01); *G06T 7/74* (2017.01); *G06T 2207/10116* (2013.01); *G06T 2207/30008* (2013.01); *G06T 2207/30204* (2013.01)

(58) Field of Classification Search
None
See application file for complete search history.

(56) References Cited

U.S. PATENT DOCUMENTS 5,702,389 A    12/1997  Taylor et al.
5,728,095 A    3/1998  Taylor et al.
(Continued)

FOREIGN PATENT DOCUMENTS

CN      102883671 A    1/2013
EP        2571433      6/2016
(Continued)

OTHER PUBLICATIONS

International Search Report and Written Opinion of the International Searching Authority for International Application No. PCT/US2018/047880 mailed on Dec. 3, 2018.
(Continued)

*Primary Examiner* — Vincent Rudolph
(74) *Attorney, Agent, or Firm* — Price Heneveld LLP

(57) ABSTRACT

The present disclosure provides methods for determining an adjustment prescription of an external fixation device affixed to anatomical structures. The methods include obtaining at least two digital radiographic images of differing orientations of the external fixation device and anatomical structures in an initial arrangement. The methods also include identifying fiducial markers of the external fixation device and an axis of the anatomical structures in the at least two radiographic images. The methods include providing a virtual manipulatable three-dimensional model of the external fixation device and the anatomical structures. The methods include providing an adjustment prescription of strut assemblies of the external fixation device based on a user determined desired arrangement of the anatomical structures that rearranges the anatomical structures from the initial arrangement to the desired arrangement via at least one user selected waypoint. The user determined desired arrangement of the anatomical structures is determined via the three-dimensional model.

10 Claims, 17 Drawing Sheets

Related U.S. Application Data

(60) Provisional application No. 62/549,841, filed on Aug. 24, 2017.

(56) References Cited

U.S. PATENT DOCUMENTS

| | | | |
|---|---|---|---|
| 5,891,143 | A | 4/1999 | Taylor et al. |
| 5,971,984 | A | 10/1999 | Taylor et al. |
| 6,030,386 | A | 2/2000 | Taylor et al. |
| 6,129,727 | A | 10/2000 | Austin et al. |
| 6,701,174 | B1 | 3/2004 | Krause et al. |
| 7,449,023 | B2 | 11/2008 | Walulik et al. |
| 8,654,150 | B2 | 2/2014 | Haskell |
| 9,642,649 | B2 | 5/2017 | Nikonovas |
| 10,213,261 | B2 * | 2/2019 | Haskell .................... G06T 17/00 |
| 2004/0264648 | A1 | 12/2004 | Claus |
| 2010/0292963 | A1 | 11/2010 | Schroeder |
| 2011/0081001 | A1 | 4/2011 | Gertner et al. |
| 2011/0092812 | A1 | 4/2011 | Webber |
| 2011/0313418 | A1 * | 12/2011 | Nikonovas ............. A61B 17/66 606/56 |
| 2013/0215114 | A1 | 8/2013 | Cherkashin |
| 2015/0085979 | A1 | 3/2015 | Zheng et al. |
| 2015/0178584 | A1 | 6/2015 | Aller |
| 2017/0323443 | A1 | 11/2017 | Dhruwdas |
| 2018/0071032 | A1 | 3/2018 | de Almeida Barreto |
| 2018/0144501 | A1 | 5/2018 | Albiol Colomer et al. |

FOREIGN PATENT DOCUMENTS

| | | |
|---|---|---|
| EP | 2571433 B1 | 6/2016 |
| JP | 2013526377 A | 6/2013 |
| WO | 2014163591 A1 | 10/2014 |
| WO | 2017139517 A1 | 8/2017 |
| WO | 2018127501 | 7/2018 |
| WO | 2020023686 | 1/2020 |

OTHER PUBLICATIONS

International Preliminary Report on Patentability for International Application No. PCT/US2018/047880, Feb. 25, 2020, 8 pages, International Bureau of WIPO.

Browbank, I. et al., "Robotic-assisted internal fixation of hip fractures: a fluoroscopy-based intraoperative registration technique", Proceedings of the Institution of Mechanical Engineers, Journal of Engineering in Medicine, Part H, Mechanical Engineering Publications Ltd, London, GB, vol. 214, No. Part H02, pp. 165-179, Jan. 2000.

Extended European Search Report issued in European Patent Application No. 18847520.6, Sep. 6, 2021, 10 pages.

* cited by examiner

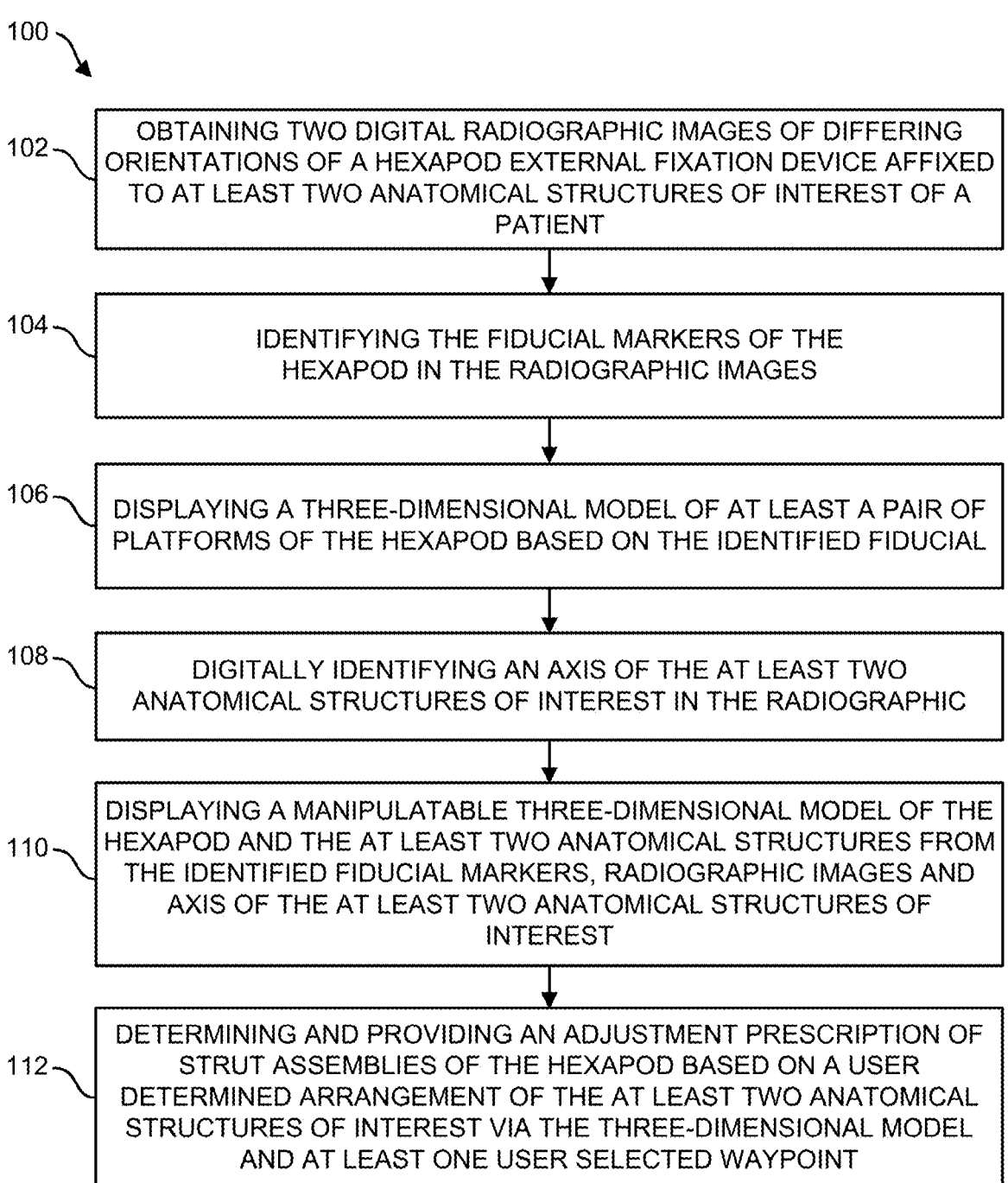

100

102 — OBTAINING TWO DIGITAL RADIOGRAPHIC IMAGES OF DIFFERING ORIENTATIONS OF A HEXAPOD EXTERNAL FIXATION DEVICE AFFIXED TO AT LEAST TWO ANATOMICAL STRUCTURES OF INTEREST OF A PATIENT

104 — IDENTIFYING THE FIDUCIAL MARKERS OF THE HEXAPOD IN THE RADIOGRAPHIC IMAGES

106 — DISPLAYING A THREE-DIMENSIONAL MODEL OF AT LEAST A PAIR OF PLATFORMS OF THE HEXAPOD BASED ON THE IDENTIFIED FIDUCIAL

108 — DIGITALLY IDENTIFYING AN AXIS OF THE AT LEAST TWO ANATOMICAL STRUCTURES OF INTEREST IN THE RADIOGRAPHIC

110 — DISPLAYING A MANIPULATABLE THREE-DIMENSIONAL MODEL OF THE HEXAPOD AND THE AT LEAST TWO ANATOMICAL STRUCTURES FROM THE IDENTIFIED FIDUCIAL MARKERS, RADIOGRAPHIC IMAGES AND AXIS OF THE AT LEAST TWO ANATOMICAL STRUCTURES OF INTEREST

112 — DETERMINING AND PROVIDING AN ADJUSTMENT PRESCRIPTION OF STRUT ASSEMBLIES OF THE HEXAPOD BASED ON A USER DETERMINED ARRANGEMENT OF THE AT LEAST TWO ANATOMICAL STRUCTURES OF INTEREST VIA THE THREE-DIMENSIONAL MODEL AND AT LEAST ONE USER SELECTED WAYPOINT

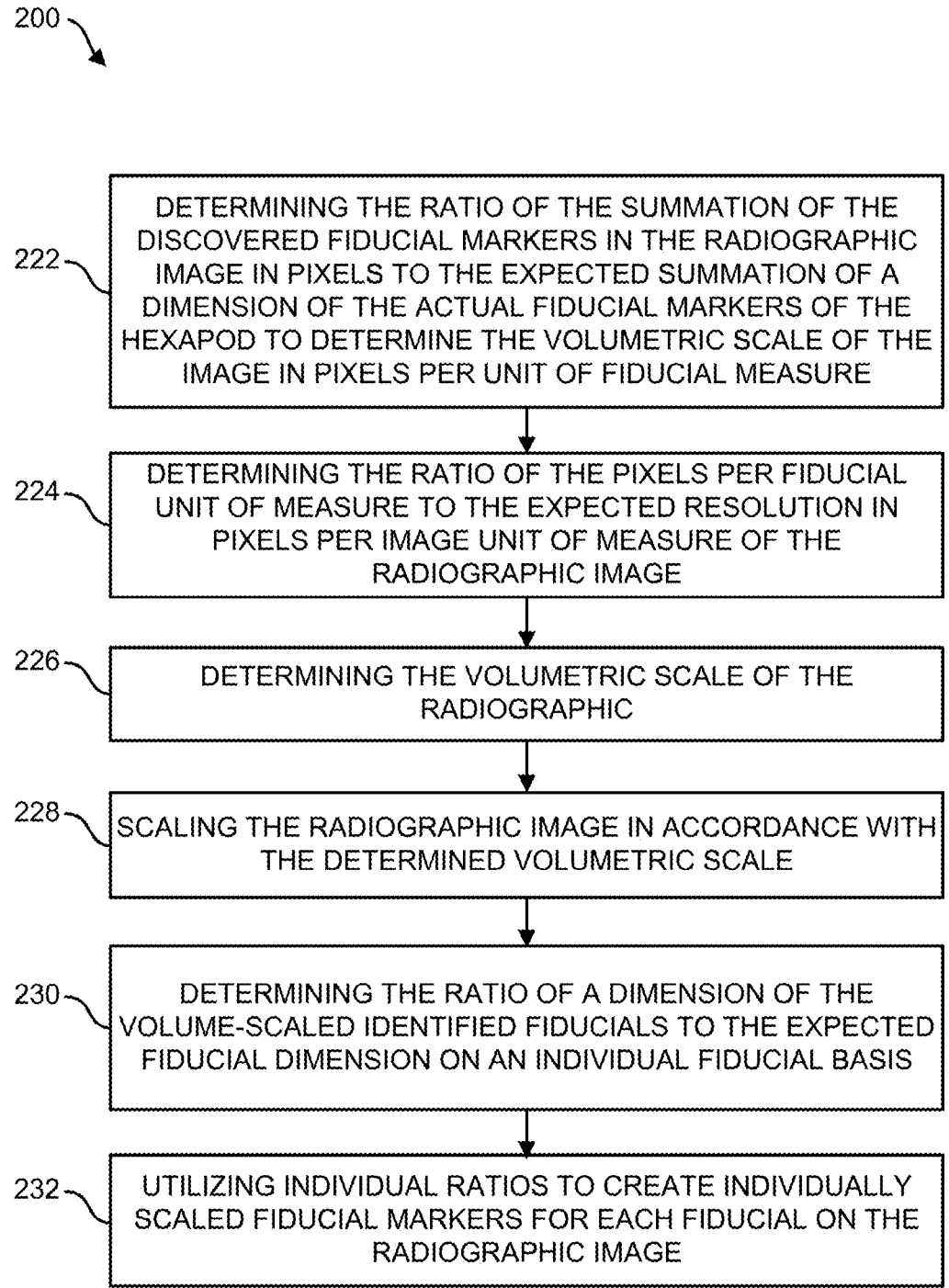

200

222 — DETERMINING THE RATIO OF THE SUMMATION OF THE DISCOVERED FIDUCIAL MARKERS IN THE RADIOGRAPHIC IMAGE IN PIXELS TO THE EXPECTED SUMMATION OF A DIMENSION OF THE ACTUAL FIDUCIAL MARKERS OF THE HEXAPOD TO DETERMINE THE VOLUMETRIC SCALE OF THE IMAGE IN PIXELS PER UNIT OF FIDUCIAL MEASURE

224 — DETERMINING THE RATIO OF THE PIXELS PER FIDUCIAL UNIT OF MEASURE TO THE EXPECTED RESOLUTION IN PIXELS PER IMAGE UNIT OF MEASURE OF THE RADIOGRAPHIC IMAGE

226 — DETERMINING THE VOLUMETRIC SCALE OF THE RADIOGRAPHIC

228 — SCALING THE RADIOGRAPHIC IMAGE IN ACCORDANCE WITH THE DETERMINED VOLUMETRIC SCALE

230 — DETERMINING THE RATIO OF A DIMENSION OF THE VOLUME-SCALED IDENTIFIED FIDUCIALS TO THE EXPECTED FIDUCIAL DIMENSION ON AN INDIVIDUAL FIDUCIAL BASIS

232 — UTILIZING INDIVIDUAL RATIOS TO CREATE INDIVIDUALLY SCALED FIDUCIAL MARKERS FOR EACH FIDUCIAL ON THE RADIOGRAPHIC IMAGE

FIG. 12

METHODS AND SYSTEMS FOR DETERMINING ADJUSTMENT PRESCRIPTIONS OF EXTERNAL FIXATION DEVICES

CROSS REFERENCE TO RELATED APPLICATIONS

This application claims priority benefit from International Application No. PCT/US2018/047880 filed on Aug. 24, 2018, which claimed priority from U.S. provisional application No. 62/549,841 filed Aug. 24, 2017, each of which is incorporated herein by reference in its entirety.

FIELD OF THE INVENTION

Embodiments of the disclosure are directed to treating musculoskeletal conditions, including skeletal fractures. More specifically, methods and systems for securing and placing segments of a bone or bones in desired locations are disclosed. In some embodiments of the disclosure, methods and systems are used to generate a computer model of a fixation device and bone segments. Through operations on the model, desired placement of the bones segments and operation of an external fixation device to achieve such desired placement is determined quickly and accurately regardless of the initial configuration of the fixation device. The operations required to create the desired placement of the bones segments may then be enacted on the corresponding fixation device and bone segments to treat the musculoskeletal condition.

BACKGROUND OF THE INVENTION

Devices and methods of treating skeletal fractures using ring external fixation structures are well known in the art. For example, many external ring fixators based on the general concept of a Stewart platform (often referred to as hexapods) have been developed and are used to manipulate anatomical structures, such as bone segments, into a desired arrangement (such as to, ultimately, achieve fixation thereof). Hexapods or Stewart platforms include six degree of freedom (6DOF) parallel manipulators or struts extending between at least a pair of platforms (e.g., rings) that serve as anatomical fixation platforms. The platforms are affixed to the anatomical structures of interest, and the platforms are manipulated via the struts to in turn manipulate the anatomical structures into a desired placement. Hexapods are thereby able to manipulate one or more bone segment or other anatomical structure of interest relative to a base in all three orthogonal axis translations (X, Y, Z position) and all rotations about those three orthogonal axes (roll, pitch, yaw pose). For example, U.S. Pat. Nos. 5,702,389; 5,728,095; 5,891,143; 5,971,984; 6,030,386; 6,129,727 and International PCT Patent Application No. PCT/US2017/017276 disclose many Stewart platform based external fixators, which are each expressly incorporated herein by reference in their entirety.

In use, after the platforms of a hexapod are affixed to two or more bone segments (or other anatomical structures), the struts are manually individually incrementally adjusted (i.e., length adjustment two or more struts) over time to slowly manipulate the platforms and, thereby, the bone segments into a desired placement. This incremental adjustment of the struts to ultimately achieve the desired placement is typically done by medical personnel and/or the patient according to an adjustment or fixation prescription or plan. An adjustment prescription typically includes a strut adjustment schedule or directions that directs the medical personnel and/or the patient to incrementally adjust the length of the struts over time intervals to reorient the bone segments from an initial placement or arrangement to the desired placement or arrangement.

An adjustment prescription may be determined via a computer assisted program or system. For example, some adjustment prescriptions are determined by a computer based system or program that provides to the user a two or three-dimensional model of a hexapod or other external fixation system affixed to anatomy of interest, such as bone segments. Some such adjustment prescription programs and systems utilize radiography images (e.g., x-rays) of the patient with the affixed hexapod taken along two or more anatomical planes to form the three-dimensional model. These programs and systems allow the user to utilize the model illustrating the hexapod and anatomy to manipulate the hexapod and anatomy into an arrangement wherein the anatomy is at a desired placement or arrangement, such as to achieve fixation of bone segments for example. The computer based system or program then automatically creates the entire adjustment prescription based on the current condition of the hexapod and anatomy and the desired placement of the anatomy. The user is thereby unable to control, dictate or customize the adjustment prescription.

A typical radiography machine that produces the radiography images used by many adjustment prescription systems and methods utilizes a beam of X-rays (or other form of electromagnetic radiation) via a generator that is projected toward the hexapod affixed to the patient, which is often referred to as projectional radiography. A certain amount of X-rays are absorbed by the hexapod and the anatomy patient, dependent upon the density and composition thereof. Any X-rays that pass through the hexapod and the patient are captured by a detector (e.g., a photographic film or a digital detector) positioned behind the hexapod and patient. The detected X-rays are then displayed as an image indicating the relative amounts of detected X-rays, and thereby the features of the hexapod and the anatomy of the patient.

However, projectional radiography typically produces an image that has features of the hexapod and/or anatomy that are magnified in both size and location relative to the center of the image. The magnitude of this magnification may be a linear function of the features' distance from the detector, as the x-rays may be emitted from a generation focal point or area. For example, features that are positioned further from the detector are magnified greater than features that are positioned relatively closer to the detector due to the divergence of the x-rays from the generation point/area. In this way, the features that are positioned further from the detector cast a larger shadow of absorbed x-rays at the detector (and thereby less detected x-rays) than as compared to that of the features that are positioned relatively closer to the detector.

As will be appreciated by one skilled in the art, what is needed are external fixation device (e.g., hexapod) adjustment prescription methods, systems and apparatus that provide user customizable and/or controllable adjustment prescriptions. Further, external fixation device (e.g., hexapod) adjustment prescription methods, systems and apparatus that account for the inherent distortion in projectional radiographic images are desirable. Also, external fixation device (e.g., hexapod) adjustment prescription methods, systems and apparatus that can utilize radiographic images of unknown and/or inaccurately identified vantage points (i.e., radiographic images taken along unknown and/or accurately identified anatomical planes) would be advantageous. Such improved external fixation device adjustment prescription methods, systems and apparatus may be implemented through software that is operative to be run, updated, and replaced over a network either by storage and use on distributed computers or a central computer or a combination of both.

SUMMARY OF THE INVENTION

The present application discloses external fixation device (e.g., hexapod) adjustment prescription methods, systems and apparatus that provide user customizable and/or controllable adjustment prescriptions. Further, the present application discloses external fixation device (e.g., hexapod) adjustment prescription methods, systems and apparatus that account for the inherent distortion in projectional radiographic images. The present application also discloses external fixation device (e.g., hexapod) adjustment prescription methods, systems and apparatus that can utilize and account for radiographic images of unknown and/or inaccurately identified vantage points (i.e., radiographic images taken along unknown and/or accurately identified anatomical planes).

In one aspect, the present disclosure provides a method of determining an adjustment prescription of an external fixation device affixed to anatomical structures. The method includes obtaining at least two digital radiographic images of differing orientations of the external fixation device and anatomical structures in an initial arrangement. The method also includes identifying fiducial markers of the external fixation device in the at least two radiographic images. The method further includes identifying an axis of the anatomical structures in the at least two radiographic images. The method also includes providing a virtual manipulatable three-dimensional model of the external fixation device and the anatomical structures from the identified fiducial markers, the at least two radiographic images and the identified axis of the anatomical structures. The method further includes providing an adjustment prescription of strut assemblies of the external fixation device based on a user determined desired arrangement of the anatomical structures that rearranges the anatomical structures from the initial arrangement to the desired arrangement via at least one user selected waypoint, wherein the user determined desired arrangement of the anatomical structures is determined via the three-dimensional model.

In some embodiments, the method is implemented in a computer system. In some embodiments, the external fixation device is a hexapod type external fixation device. In some embodiments, identifying fiducial markers of the external fixation device in the at least two radiographic images comprises creating individually scaled digital fiducial markers for each fiducial in the radiographic images by correcting distortion of the radiographic images. In some such embodiments, correcting distortion of the radiographic images comprises: determining a ratio of the summation of the fiducial markers in the radiographic image in pixels to the expected summation of a dimension of the actual fiducial markers of the external fixation device to determine a volumetric scale of the image in pixels per unit of fiducial measure; determining a ratio of the pixels per fiducial unit of measure to the expected resolution in pixels per image unit of measure of the radiographic image; determining the volumetric scale of the radiographic image; scaling the radiographic image in accordance with the determined volumetric scale; determining the ratio of a dimension of the volume-scaled identified fiducials to the expected fiducial dimension on an individual fiducial basis; and utilizing the individual ratios to create the individually scaled digital fiducial markers for each fiducial on the radiographic image.

In another aspect, the present disclosure provides a computer program product comprising a computer readable storage medium storing instructions for execution to perform a method of determining an adjustment prescription of an external fixation device affixed to anatomical structures. The method includes obtaining at least two digital radiographic images of differing orientations of the external fixation device and anatomical structures in an initial arrangement. The method also includes identifying fiducial markers of the external fixation device in the at least two radiographic images. The method further includes identifying an axis of the anatomical structures in the at least two radiographic images. The method also includes providing a virtual manipulatable three-dimensional model of the external fixation device and the anatomical structures from the identified fiducial markers, the at least two radiographic images and the identified axis of the anatomical structures. The method further includes providing an adjustment prescription of strut assemblies of the external fixation device based on a user determined desired arrangement of the anatomical structures that rearranges the anatomical structures from the initial arrangement to the desired arrangement via at least one user selected waypoint, wherein the user determined desired arrangement of the anatomical structures is determined via the three-dimensional model.

In some embodiments, the external fixation device is a hexapod type external fixation device. In some embodiments, identifying fiducial markers of the external fixation device in the at least two radiographic images comprises creating individually scaled digital fiducial markers for each fiducial in the radiographic images by correcting distortion of the radiographic images. In some such embodiments, correcting distortion of the radiographic images comprises: determining a ratio of the summation of the fiducial markers in the radiographic image in pixels to the expected summation of a dimension of the actual fiducial markers of the external fixation device to determine a volumetric scale of the image in pixels per unit of fiducial measure; determining a ratio of the pixels per fiducial unit of measure to the expected resolution in pixels per image unit of measure of the radiographic image; determining the volumetric scale of the radiographic image; scaling the radiographic image in accordance with the determined volumetric scale; determining the ratio of a dimension of the volume-scaled identified fiducials to the expected fiducial dimension on an individual fiducial basis; and utilizing the individual ratios to create the individually scaled digital fiducial markers for each fiducial on the radiographic image.

In another aspect, the present disclosure provides a computer system configured to perform a method, the method comprising determining an adjustment prescription of an external fixation device affixed to anatomical structures. Determining an adjustment prescription includes obtaining at least two digital radiographic images of differing orientations of the external fixation device and anatomical structures in an initial arrangement. Determining an adjustment prescription also includes identifying fiducial markers of the external fixation device in the at least two radiographic images. Determining an adjustment prescription further includes identifying an axis of the anatomical structures in the at least two radiographic images. Determining an adjustment prescription further includes providing a virtual manipulatable three-dimensional model of the external fixation device and the anatomical structures from the identified fiducial markers, the at least two radiographic images and the identified axis of the anatomical structures. Determining an adjustment prescription also includes providing an adjustment prescription of strut assemblies of the external fixation device based on a user determined desired arrangement of the anatomical structures that rearranges the anatomical structures from the initial arrangement to the desired arrangement via at least one user selected waypoint, wherein the user determined desired arrangement of the anatomical structures is determined via the three-dimensional model.

In some embodiments, the external fixation device is a hexapod type external fixation device. In some embodiments, identifying fiducial markers of the external fixation device in the at least two radiographic images comprises creating individually scaled digital fiducial markers for each fiducial in the radiographic images by correcting distortion of the radiographic images. In some such embodiments, correcting distortion of the radiographic images comprises: determining a ratio of the summation of the fiducial markers in the radiographic image in pixels to the expected summation of a dimension of the actual fiducial markers of the external fixation device to determine a volumetric scale of the image in pixels per unit of fiducial measure; determining a ratio of the pixels per fiducial unit of measure to the expected resolution in pixels per image unit of measure of the radiographic image; determining the volumetric scale of the radiographic image; scaling the radiographic image in accordance with the determined volumetric scale; determining the ratio of a dimension of the volume-scaled identified fiducials to the expected fiducial dimension on an individual fiducial basis; and utilizing the individual ratios to create the individually scaled digital fiducial markers for each fiducial on the radiographic image.

In another aspect, the present disclosure provides a method of correcting distortion of a radiographic image of fiducial markers of an external fixation device and anatomical structures. The method includes determining a ratio of the summation of the fiducial markers in the radiographic image in pixels to the expected summation of a dimension of the actual fiducial markers of the external fixation device to determine a volumetric scale of the image in pixels per unit of fiducial measure. The method also includes determining a ratio of the pixels per fiducial unit of measure to the expected resolution in pixels per image unit of measure of the radiographic image. The method further includes determining the volumetric scale of the radiographic image. The method also includes scaling the radiographic image in accordance with the determined volumetric scale. The method further includes determining the ratio of a dimension of the volume-scaled identified fiducials to the expected fiducial dimension on an individual fiducial basis. The method also includes utilizing the individual ratios to create individually scaled digital fiducial markers for each fiducial on the radiographic image.

In some embodiments, determining the volumetric scale of the radiographic image comprises determining the ration of the volumetric scale of the image in pixels per unit of fiducial measure to the ratio of the pixels per fiducial unit of measure to the expected resolution in pixels per image unit of measure of the radiographic image. In some embodiments, the method is implemented in a computer system.

In another aspect, the present disclosure provides a computer program product comprising a computer readable storage medium storing instructions for execution to perform a method of correcting distortion of a radiographic image of fiducial markers of an external fixation device and anatomical structures. The method includes determining a ratio of the summation of the fiducial markers in the radiographic image in pixels to the expected summation of a dimension of the actual fiducial markers of the external fixation device to determine a volumetric scale of the image in pixels per unit of fiducial measure. The method also includes determining a ratio of the pixels per fiducial unit of measure to the expected resolution in pixels per image unit of measure of the radiographic image. The method further includes determining the volumetric scale of the radiographic image. The method also includes scaling the radiographic image in accordance with the determined volumetric scale. The method further includes determining the ratio of a dimension of the volume-scaled identified fiducials to the expected fiducial dimension on an individual fiducial basis. The method also includes utilizing the individual ratios to create individually scaled digital fiducial markers for each fiducial on the radiographic image.

In some embodiments, determining the volumetric scale of the radiographic image comprises determining the ration of the volumetric scale of the image in pixels per unit of fiducial measure to the ratio of the pixels per fiducial unit of measure to the expected resolution in pixels per image unit of measure of the radiographic image.

In another aspect, the present disclosure provides a computer system configured to perform a method comprising correcting distortion of a radiographic image of fiducial markers of an external fixation device and anatomical structures. The method may include determining a ratio of the summation of the fiducial markers in the radiographic image in pixels to the expected summation of a dimension of the actual fiducial markers of the external fixation device to determine a volumetric scale of the image in pixels per unit of fiducial measure. The method may also include determining a ratio of the pixels per fiducial unit of measure to the expected resolution in pixels per image unit of measure of the radiographic image. The method may further include determining the volumetric scale of the radiographic image. The method may also include scaling the radiographic image in accordance with the determined volumetric scale. The method may further include determining the ratio of a dimension of the volume-scaled identified fiducials to the expected fiducial dimension on an individual fiducial basis. The method may also include utilizing the individual ratios to create individually scaled digital fiducial markers for each fiducial on the radiographic image.

In some embodiments, determining the volumetric scale of the radiographic image comprises determining the ration of the volumetric scale of the image in pixels per unit of fiducial measure to the ratio of the pixels per fiducial unit of measure to the expected resolution in pixels per image unit of measure of the radiographic image.

These, and other objects, features and advantages of this disclosure will become apparent from the following detailed description of the various aspects of the disclosure taken in conjunction with the accompanying drawings.

BRIEF DESCRIPTION OF DRAWINGS

The accompanying drawings, which are incorporated in and constitute a part of the specification, illustrate embodiments of the present disclosure and together with the detailed description herein, serve to explain the principles of the present disclosure. The drawings are only for purposes of illustrating some embodiments and are not to be construed as limiting the present disclosure. It is emphasized that, in accordance with the standard practice in the industry, various features may not be drawn to scale. The foregoing and other objects, features and advantages of the present disclosure are apparent from the following detailed description taken in conjunction with the accompanying drawings in which:

FIG. 4 is a flow diagram of an exemplary external fixation device adjustment prescription determination method and system according to the present disclosure;

FIG. 12 is a flow diagram of an exemplary radiographic image distortion correction scheme according to the present disclosure;

DETAILED DESCRIPTION FOR CARRYING OUT THE INVENTION

In this detailed description and the following claims, the words proximal, distal, anterior, posterior, medial, lateral, superior and inferior are defined by their standard usage for indicating a particular part of a bone or implant according to the relative disposition of the natural bone or directional terms of reference. For example, "proximal" means the portion of an implant nearest the torso, while "distal" indicates the portion of the implant farthest from the torso. As for directional terms, "anterior" is a direction towards the front side of the body, "posterior" means a direction towards the back side of the body, "medial" means towards the midline of the body, "lateral" is a direction towards the sides or away from the midline of the body, "superior" means a direction above and "inferior" means a direction below another object or structure. In addition, for the purposes of this disclosure when referencing the device, the term "proximal" will mean the portion of the device closest or nearest the insertion instrument. The term "distal" shall mean the portion of the device farthest away from the insertion instrument. The terms osteosynthesis, osteotomy and the like are used herein to refer to the promotion of bone formation/growth and bone in-growth, as explained further below.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

The present application discloses external fixation device (e.g., hexapod) adjustment prescription methods, systems and apparatus that provide user customizable and/or controllable adjustment prescriptions. Further, the present application discloses external fixation device (e.g., hexapod) adjustment prescription methods, systems and apparatus that account for the inherent distortion in projectional radiographic images. The present application also discloses external fixation device (e.g., hexapod) adjustment prescription methods, systems and apparatus that can utilize and account for radiographic images of unknown and/or inaccurately identified vantage points (i.e., radiographic images taken along unknown and/or accurately identified anatomical planes).

Figure 1:
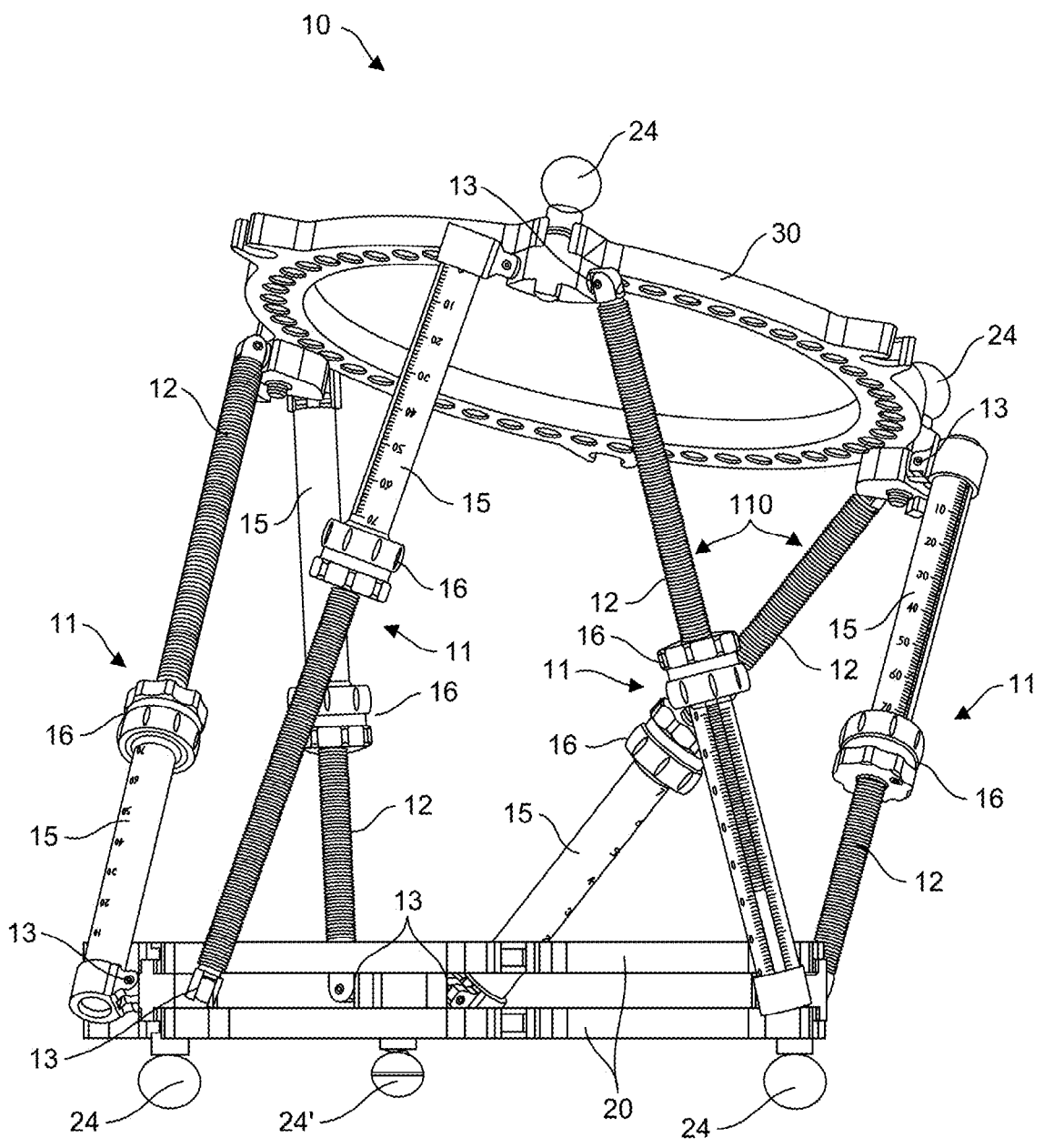
FIG. 1 is a perspective view of an exemplary hexapod type orthopedic external fixation device according to the present disclosure.
Figure 2:
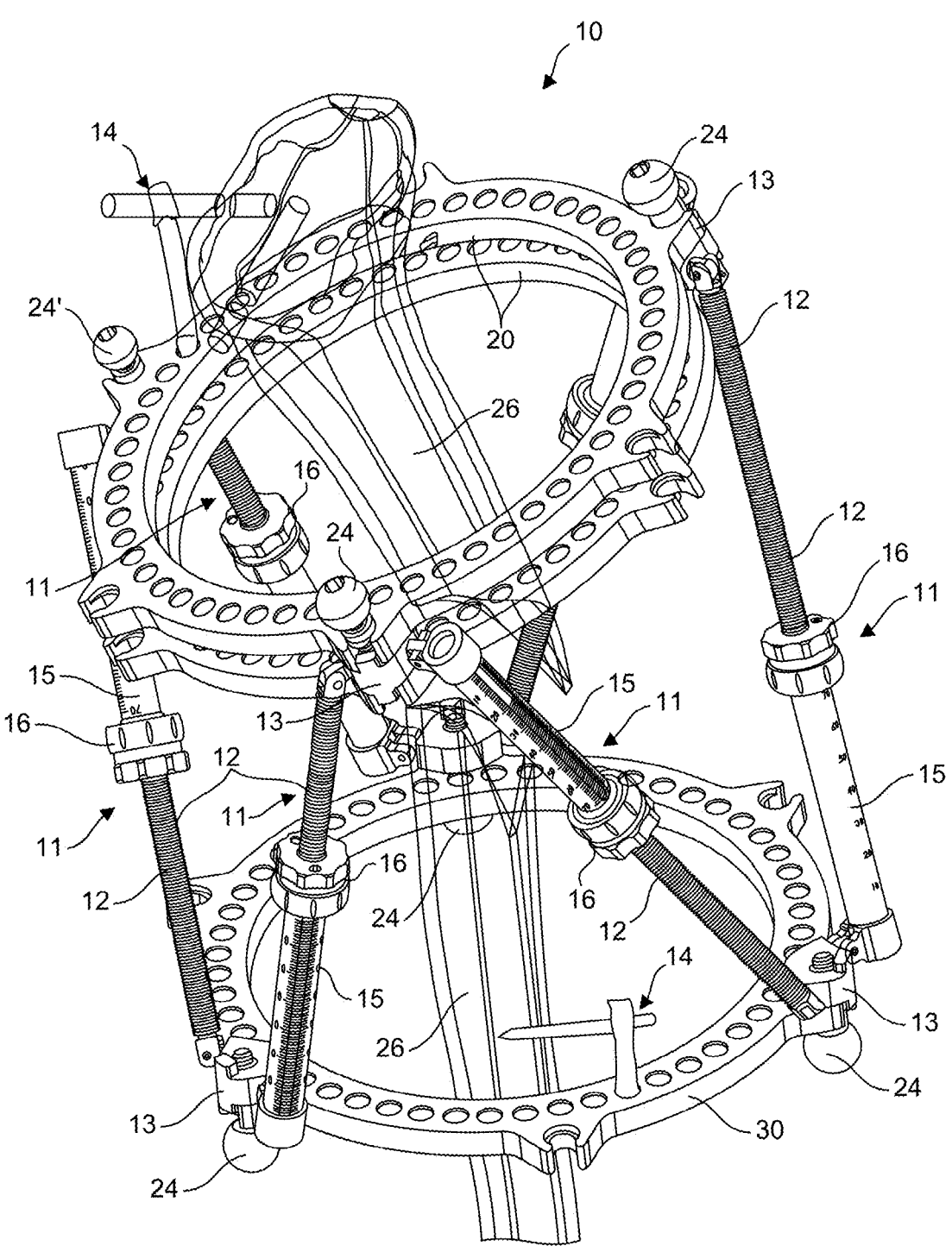
FIG. 2 is another perspective view of the external fixation device of FIG. 1 affixed to exemplary bone segments of a patient in an undesired or initial arrangement.
Figure 3:
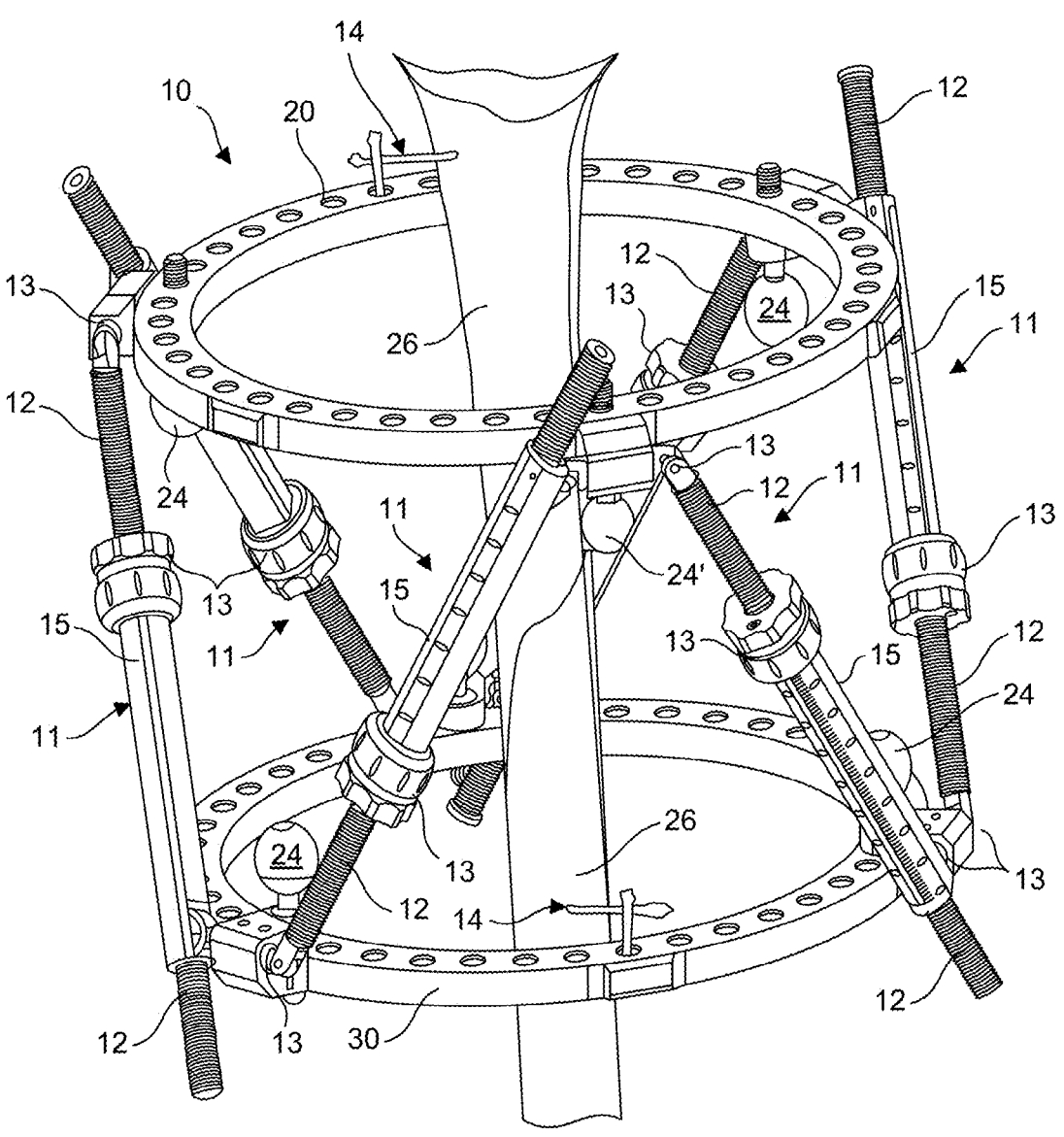
FIG. 3 is a perspective view of another exemplary external fixation device affixed to exemplary bone segments of a patient in a desired or treated arrangement.

Referring to the drawings, and with particular reference to FIGS. 1-3, there is illustrated an exemplary external orthopedic fixation device 10 useful for manipulating anatomy 26 of a patient into a desired placement or arrangement from an initial or undesirable placement or arrangement (e.g., bone segments 26 (with may be either fragments of a single bone or two or more bones and/or segments thereof)). The illustrated device 10 in FIGS. 1-3 is a hexapod or Stewart platform based ring fixator device, however the methods and systems described herein may be applicable, as explained below, to other types of orthopedic external fixation systems that operate similarly to hexapods. In some embodiments, the device 10 may be hexapod disclosed in International PCT Patent Application No. PCT/US2017/017276, which is expressly incorporated herein by reference in its entirety.

The fixation device 10 may include at least one proximal or first platform, ring fixation element 20 and at least one distal or second platform, ring or fixation element 30. It is noted that depending upon the orientation of the device 10 when it is affixed or coupled to the patient, the first platform 20 could be the distal platform and the second platform 30 could be the proximal platform. As shown in FIG. 2, the first and second platforms 20, 30 may be removably affixed or coupled to respective anatomical structures 26, such as at least one first bone segment and at least one second bone segment, respectively. As shown in FIG. 2, the anatomical structures 26 (e.g., bone segments) may be coupled with the first and second platforms 20, 30 via pin structures 14. However, any other device or mechanism may be utilized to removably couple the anatomical structures and first and second platforms 20, 30, such as but not limited to wires, bilateral pins, screws, or any variety of coupling devices effective to secure a bone segment relative to a platform. Further, it is noted that the anatomical structures 26 may be any anatomical structures that would benefit from relative manipulation or movement from an initial arrangement (e.g., an undesirable arrangement) to a desired arrangement (e.g., a corrected arrangement). As one example, the anatomical structures 26 may be bone segments that are initially arranged in an undesirable or detrimental arrangement that are coupled to the first and second platforms 20, 30 and manipulated via the device 10 into a desired arrangement, such as an arrangement that promotes and/or facilitates fixation of the bone segments.

As shown in FIGS. 1-3, the first and second platforms 20, 30 are coupled to each other by six length-adjustable strut assemblies 11. Each of the strut assemblies 11 is coupled at its first end to the first fixation element 10 and at its second end to the second fixation element 20 via joints 13 that allow three rotations about three orthogonal axes. As shown in FIGS. 1-3, the strut assemblies 11 may be positioned and coupled about (e.g., circumferentially) the first and second platforms 20, 30, and each strut assembly 11 may be attached to the first and second platforms 20, 30 via the joints 13 at differing positions about a central axis of the platforms 20, 30 and the device 10 (i.e., about the anatomy of a patient). In this way, by adjusting the lengths of the strut assemblies 11, the fixation device 10 is able to manipulate at least one first anatomical structure coupled to the first platform 20 relative to at least one second anatomical structure coupled to the second platform 30 (and vice-versa) in all three orthogonal axis translations (X, Y, Z positions) and all rotations about those three orthogonal axes (roll, pitch, yaw).

The configuration of the strut assemblies 11 may be any configuration that allows the axial length of the struts 11 to be adjusted (i.e., elongated and/or shortened). In one example, as shown in FIGS. 1-3, the strut assemblies 11 may include a rod portion 12 coupled to one of the first and second platforms 20, 30 via at least one joint 13 and barrel portion 15 coupled to the other of the first and second platforms 20, 30 via at least one joint 13. The rod portion 12 and barrel portion 15 of the strut assemblies 11 may be movably coupled (e.g., threadably) such that they are selectively axially translatable with respect to each other via an adjustment mechanism 16 to adjust the axial length thereof and, thereby, adjust the distance and orientation of the first and second platforms 20, 30 and the anatomical structures 26 affixed thereto. For example, the as shown in FIG. 2 the first and second platforms 20, 30 may be affixed to first and second bone segments 26, respectively, via the fixation mechanisms 14 in an initial placement or arrangement thereof.

As shown in FIG. 3, the axial lengths of the strut assemblies 11 may be adjusted incrementally over time according to an adjustment prescription or plan determined by the methods and systems of the present disclosure (discussed further below) to reorient, align or manipulate the first and second bone segments 26 into a desired placement or arrangement (which may, in one example, promote or achieve fixation of the first and second bone segments 26).

As discussed above, an adjustment prescription or plan of an external fixation device with a plurality of strut assemblies 11, such as a hexapod with six strut assemblies 11, may be comprised of incremental length adjustments of the strut assemblies 11 over time to manipulate the corresponding anatomical structures 26 into the desired arrangement. Thereby, each strut assembly 11 may include a unique tactile and/or visual indicator to differentiate the struts 11 from each other and allow adjustment thereof according to the adjustment prescription. For example, the strut assemblies 11 may be color coded and/or numbered.

To aid or facilitate the development of an adjustment prescription, the device 10 may include fiducial markers 24 associated with the first and second platform 20, 30, as shown in FIGS. 1-3. The fiducial markers 24 may be positioned at pre-determined or specific locations on the device 10 so that they can be utilized as reference points of the position and orientation or configuration of the device 10, such as the first and second platform 20, 30 and the strut assemblies 11, for the methods and systems in determining an adjustment prescription. For example, the fiducial markers 24 may be spherical members coupled circumferentially about the first and second platforms 20, 30, as shown in FIGS. 1-3. In some embodiments, each fiducial marker 24 may be associated with (e.g., positioned proximate to) a pair of adjacent strut assemblies 11 to provide a reference as to the spatial position of an associated portion of the first or second platform 20, 30 and/or the articulation points of the joints 13 of the pair of adjacent strut assemblies 11. In some embodiments, the fiducial markers 24 may be spaced evenly about the first and second platforms 20, 30, as shown in FIGS. 1-3. In some embodiments, the fiducial markers 24 may be positioned at a fixed, predefined spatial relationship with respect to a corresponding reference point or area of the first and second platforms 20, 30 so that the position and orientation of the first and second platforms 20, 30, and thereby the position, orientation and length of the strut assemblies 11, which may be coupled to the first and second platforms 20, 30 at fixed, predefined relative positions, can be determined and displayed with the anatomical structures 26 of interest by methods and systems. In this way, the methods and systems are able to utilize the fiducial markers 24 to display and determine the initial/current and desired arrangements of the anatomical structures 26 and device 10 via radiographic images and, ultimately, determine a customized adjustment prescription to manipulate the anatomical structures 26 via the device 10 from the initial arrangement to the desired arrangement, as explained further below. The fiducial markers 24 may be formed of a material and/or shape that may be identifiable or distinguishable in a radiographic image, such as with respect to the anatomy 26 of interest and the other portions of the device 10.

As shown in FIGS. 1-3, the fiducial markers 24 may include at least one unique marker 24' that physically differs from the other markers 24 in such a manner that is discernable or identifiable from the other markers in a radiographic image (e.g., a unique marker 24' that is smaller, larger, shaped differently, composed of a different material/composition, etc. as compared to the other markers 24). The unique marker 24' may be utilized by the systems and methods to decipher or determine the identity of each strut assembly 11. For example, the unique marker 24' may be utilized by the systems and methods to determine the relative orientation of the first and second platforms 20, 30 (e.g., if the first platform 20 is the distal or proximal platform), and thereby determine the identities of the strut assemblies 11 based on a clockwise or counterclockwise (depending upon the orientation of the first and second platforms 20, 30) relative position therefrom.

The external fixation device (e.g., hexapod) adjustment prescription methods and systems of the present disclosure may make use of at least one computer. The at least one computer may be an autonomously operating computer system such as, for example, a first computer system. All storage, processing, etc. necessary to determine and display an external fixation device adjustment prescription may be accomplished with the first computer system. In other embodiments, two or more computers may be linked together over a network to accomplish tasks necessary to determine and display an external fixation device adjustment prescription. For example, first and second computer systems may be linked over a network and cooperate to determine and display an external fixation device adjustment prescription. The network may be a local area network or a wide area network such as the Internet. In some embodiments, all of the programs that are run to accomplish the tasks may be run on one or more of the computer system, and another computer system may merely be used to display data. Alternatively, the programs may be run partially on several computer systems, with data and instructions being shared over the network.

For example, in some embodiments, methods and systems of the present disclosure may utilize a computer system that runs a World Wide Web browser that executes instructions and shares data through a network with a second computer system that is a server. This is advantageous in circumstances where a larger computer system is required to run a more complex or memory intensive program. A computer assisted engineering program is an example of such a program. In some embodiments of the present invention, a server computer is used to run both a computer assisted engineering program and to serve or host a World Wide Web site. The term computer assisted engineering program includes both traditional computer aided design (CAD) programs, and programs that are capable of not only drafting, but providing design solutions and other data useful in implementing a project. For example, dynamic relationships of the components of at least one external fixation device may be provided with some such programs. Computer assisted engineering and Web hosting functions may themselves be dedicated to separate machines in some embodiments. A served program arrangement may also be beneficial because the supporting programs in such a configuration may be updated by merely updating the program at the central computer or computers. Therefore, software updates become much less complicated and much less expensive.

FIGS. 4-10 illustrate computer assisted methods and systems 100 of determining and displaying an external fixation device adjustment prescription according to the present disclosure. The adjustment prescription methods and systems 100 will be described and illustrated with reference to a hexapod type external fixation device, such as the hexapod device 10 described above, that is affixed to bone segments 26 as the anatomical structural of interest. However, as noted above and as would be appreciated by one of ordinary skill in the art, the methods and systems 100 of determining and displaying an external fixation device adjustment prescription may determine and display an adjustment prescription for any external fixation device (e.g., any hexapod or other external fixation device) for any anatomical structures without departing from the spirit and scope of the disclosure.

Figure 5:
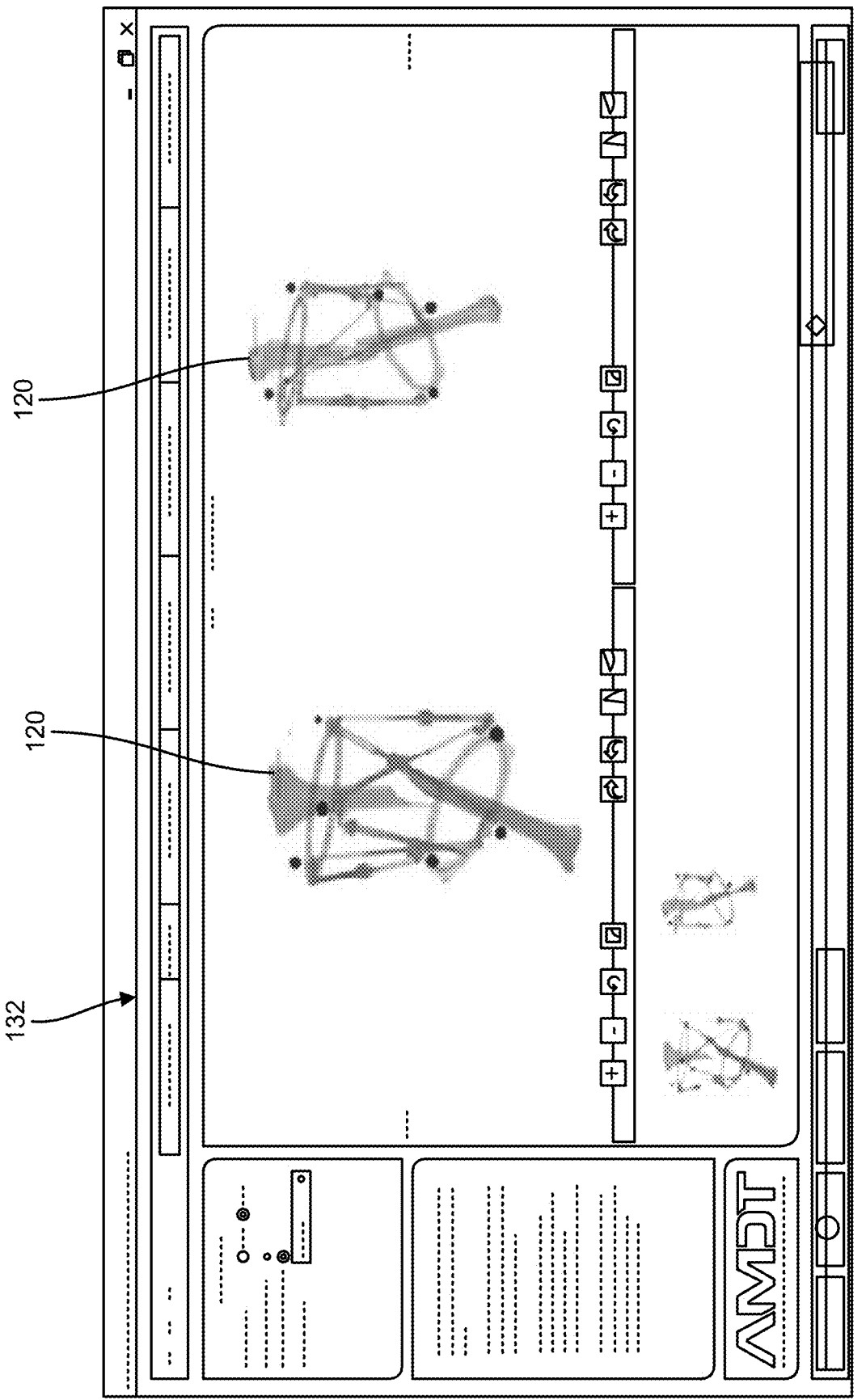
FIG. 5 is a screen shot illustrating embodiments of a graphical user interface illustrating a user obtaining radiographic images according to the prescription determination method and system of FIG. 4.

As shown in FIGS. 4-10, the methods and systems 100 may utilize a computer program and a graphical user interface (GUI) 132 of a computer system to enable a user to operate or perform the methods and systems 100. As shown in FIGS. 4 and 5, the methods and systems 100 may include may include obtaining at least two digital radiographic images 120 of differing orientations of the hexapod device (or other fixation device) affixed to the bone segments 26 (or other anatomical structures of interest), such as the hexapod device 10 described above. The radiographic images 120 and/or the program may be stored on the same computer system as the GUI 132, or a network connected computer system. Via the GUI 132, the user may be able to upload or access the radiographic images 120 and tag or identify them as the images 120 that the program will utilize to determine the adjustment prescription, as shown in FIG. 5. For example, as shown in FIG. 5 the user may access the radiographic image files and position the radiographic images 120 (or a representation thereof) in a window or designated area of the GUI 132 (or otherwise select the radiographic image files). The files containing the radiographic images 120 (i.e., the digital files) may be provided or obtained from any source, such as directly from a radiographic machine or from an intermediary source.

In some embodiments, the radiographic images 120 may be labeled or otherwise identified (such as the files themselves and/or via the program may) as images taken at particular orientations or viewpoints of the hexapod device and the patient (i.e., the anatomical structures). For example, the radiographic images 120 may be identified, at least in the program by the user (e.g., via the GUI 32), as being taken along a recognized anatomical plane (e.g., sagittal, frontal, transverse or coronal) or anatomical axis (e.g., anteroposterior (A-P) or medial-lateral (M-L)). The orientation of the hexapod and bone segments in each radiographic image 120 (or the viewpoint of the radiographic image 120) may be determinative or considered by the methods and systems 100 in creating a manipulatable three-dimensional model illustrating the hexapod and bone segments, as described further below.

Figure 6A:
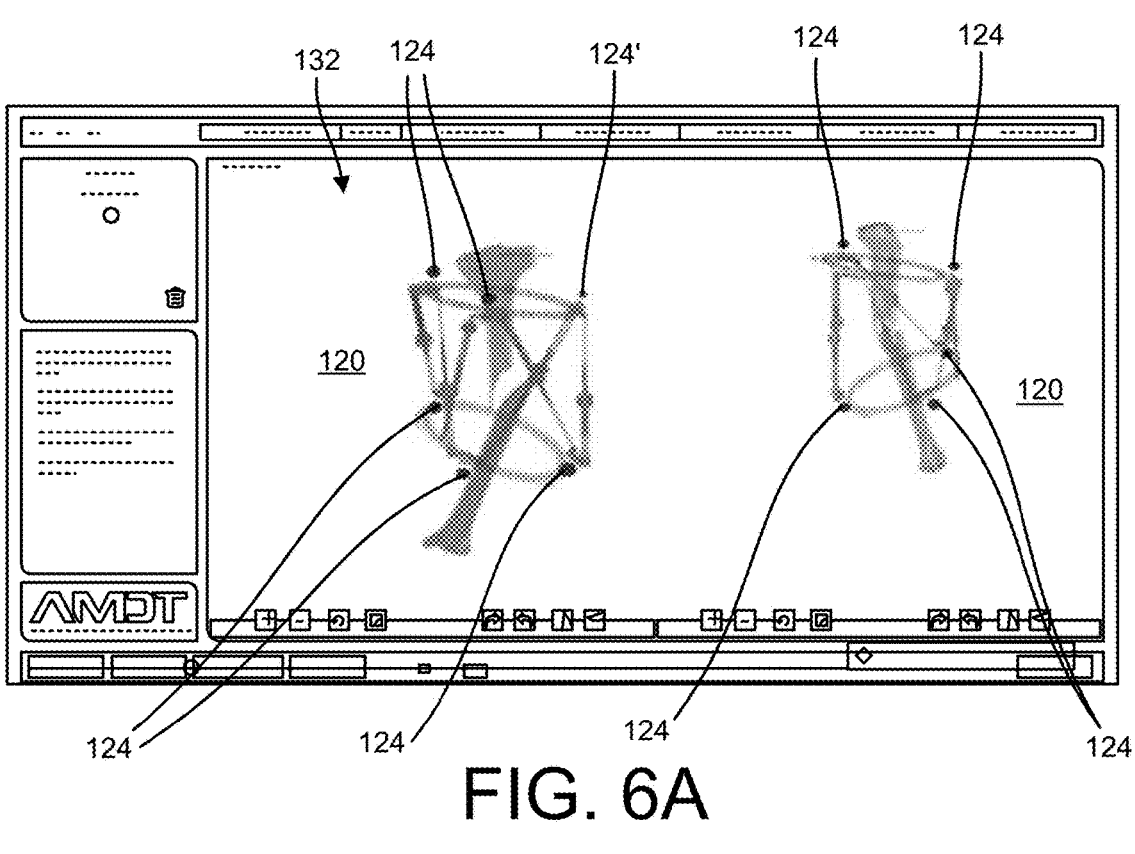
FIGS. 6A and 6B are screen shots illustrating embodiments of a graphical user interface illustrating identified fiducial markers in the radiographic images of FIG. 5 according to the prescription determination method and system of FIG. 4.
Figure 6B:
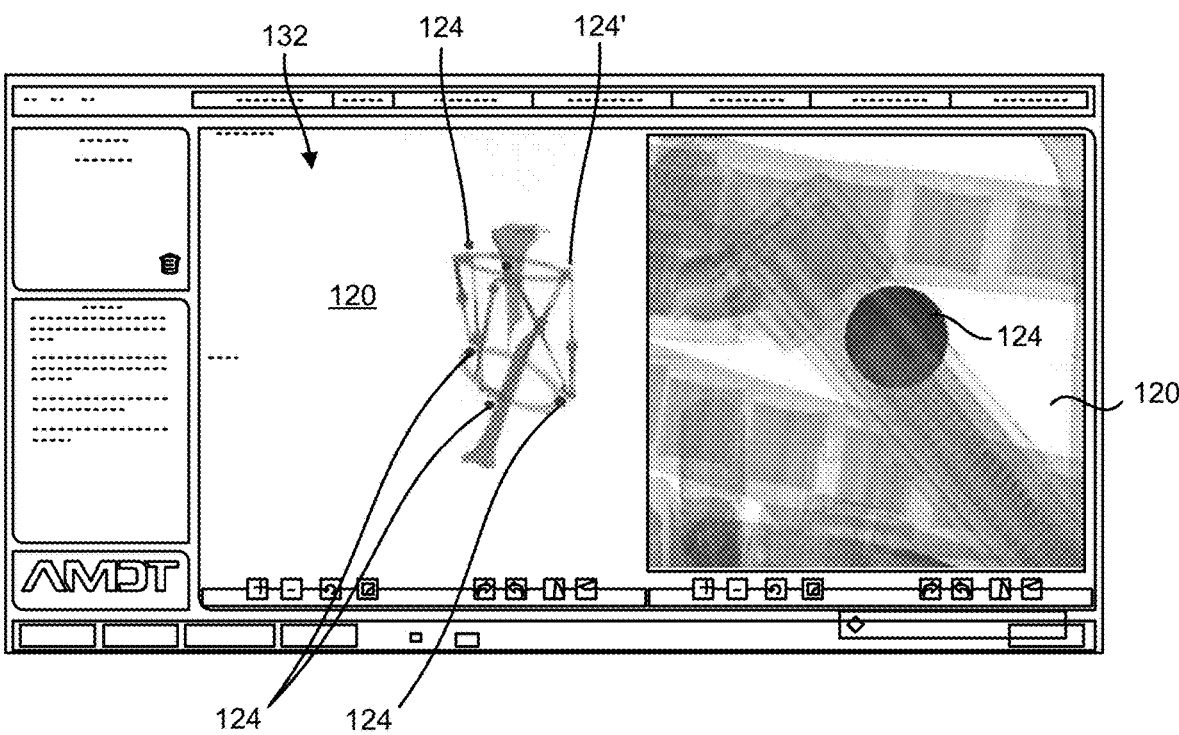

As shown in FIGS. 4, 6A and 6B, the methods and systems 100 may utilize the obtained or uploaded radiographic images 120 and identify 104 the fiducial markers of the hexapod. For example, the methods and systems 100 may automatically analyze or parse the radiographic images 120 (e.g., pixels thereof) and attempt to locate shapes/configurations in the images 120 that correspond to that of the fiducial markers of the hexapod to identify the fiducial markers in the images 120. The GUI 132 may graphically indicate to the user the identified fiducial markers 124 in the radiographic images 120 to ensure accuracy. As shown in FIGS. 6A and 6B, such fiducial marker identification 104 may be automatically accomplished by the methods and systems 100 (e.g., the program) (based on supplied information of the fiducial markers of the hexapod depicted in the images 120). To ensure accuracy of the "automatic" fiducial marker identification 104 process and/or to facilitate identification 104 of any fiducial markers that were not automatically detected by the methods and systems 100 (i.e., not automatically detected by the program), the methods and systems 100 may allow the user to manually graphically identify the location, size and/or shape of the fiducial markers in the images 120 via the GUI 132 as shown in FIG. 6B. The methods and systems 100 may then analyze or parse the user-identified area(s) or location(s) of the radiographic image(s) 120 to identify 104 the corresponding fiducial marker(s) therein. In some embodiments, if the methods and systems 100 are unable to identify a fiducial marker in the radiographic images 120, the methods and systems 100 may utilize the center of a user-identified area as the center of the fiducial marker.

In some embodiments, the methods and systems 100 may determine the orientation/configuration of the hexapod in each radiographic image 120, via the identified fiducial markers 124 and known or supplied information of the fiducial markers of the hexapod relating to the expected or actual size, shape and/or configuration of the fiducial markers of the hexapod to determine the spatial orientation/configuration of the hexapod in each image 120. For example, the methods and systems 100 may analyze or calculate the respective sizes of the identified fiducial markers 124 and their relative positions in the radiographic images 120, potentially as compared to their expected sizes and relative positions (including the unique marker 124') (which may be preloaded or supplied to the program of the methods and systems 100), and determine the relative position and orientation/configuration of the platforms of the hexapod, and thereby the struts thereof, according to each radiographic image 120.

For example, as the perspective information in each image 120 can be determined by the methods and systems 100, movement of the locations of the fiducials in the plane of each image 120 and their distance from the image 120 can be determined. Such information provides three-dimensional data for the fiducials of the hexapod in each image 120. The methods and systems 100 may utilize this three-dimensional data to place the fiducials in three-dimensional space and calculate the distance between them to create a triangle in space. The methods and systems 100 may then circumscribe this triangle with a circle. The diameter or radius of this circle may be provided to the user as the diameter or radius of the platform of the hexapod to ensure accuracy. If the diameter or radius does not match the actual utilized platform, the user may be able to override this estimated diameter or radius to the actual diameter or radius (or the actual diameter or radius may be input initially). The methods and systems 100 may compare the actual diameter or radius to the calculated one and a further scaling adjustment can be made to the volumetric scaling to increase the precision by re-running the same algorithm as described herein.

Additionally, the methods and systems 100 may utilize this three-dimensional data of each image 120 to create a tetrahedron, the base of which is the locations of the center of the identified fiducial 124 centers, and the edges of which intersecting the actual three-dimensional locations of corrected fiducials and terminating at the point of focus. The methods and systems 100 may then create an axis from this point of focus to the image center, which may be a vector describing or indicating the vantage point of the image 120. This process may be repeated for each image 120. The methods and systems 100 may then calculate the angle between the vectors of the images 120 to determine the angle between the two radiographic images 120, which may be utilized to determine the spatial orientation of the hexapod (e.g., the platforms and struts) with respect to each image 120. However, it is noted that any other method or process of determining the spatial orientation/configuration of the hexapod from the identified fiducial markers 124 in each image 120 may be utilized, as one of ordinary skill in the art would appreciate.

As shown in FIG. 4, in some embodiments, the methods and systems 100 may graphically display or illustrate the determined orientation/configuration of at least a portion of the hexapod (e.g., at least the platforms thereof) in the GUI 132 to allow the user to ensure the determined orientation/configuration is accurate. In some such embodiments, the portion(s) of the hexapod may be presented in a three-dimensional model that illustrates the orientation/configuration of the hexapod.

As an alternative to utilizing labeled or pre-identified viewpoints of the radiographic images 120 (i.e., the orientation of the hexapod and bone segments) and/or in addition thereto, the methods and systems 100 may be configured to determine the difference in viewpoints/orientations between the radiographic images 120. For example, the methods and systems 100 may compare the determined orientations/configurations of the hexapod via the identified fiducial markers 124 and the known information of the fiducial markers of the hexapod of each radiographic image 120 to determine the relative difference in the viewpoints/orientations between the radiographic images 120. In this way, the methods and systems 100 may determine the viewpoints/orientations of the radiographic images 120, and potentially utilize such information in creating the manipulatable three-dimensional model illustrating the hexapod and bone segments, as described further below.

Figure 7:
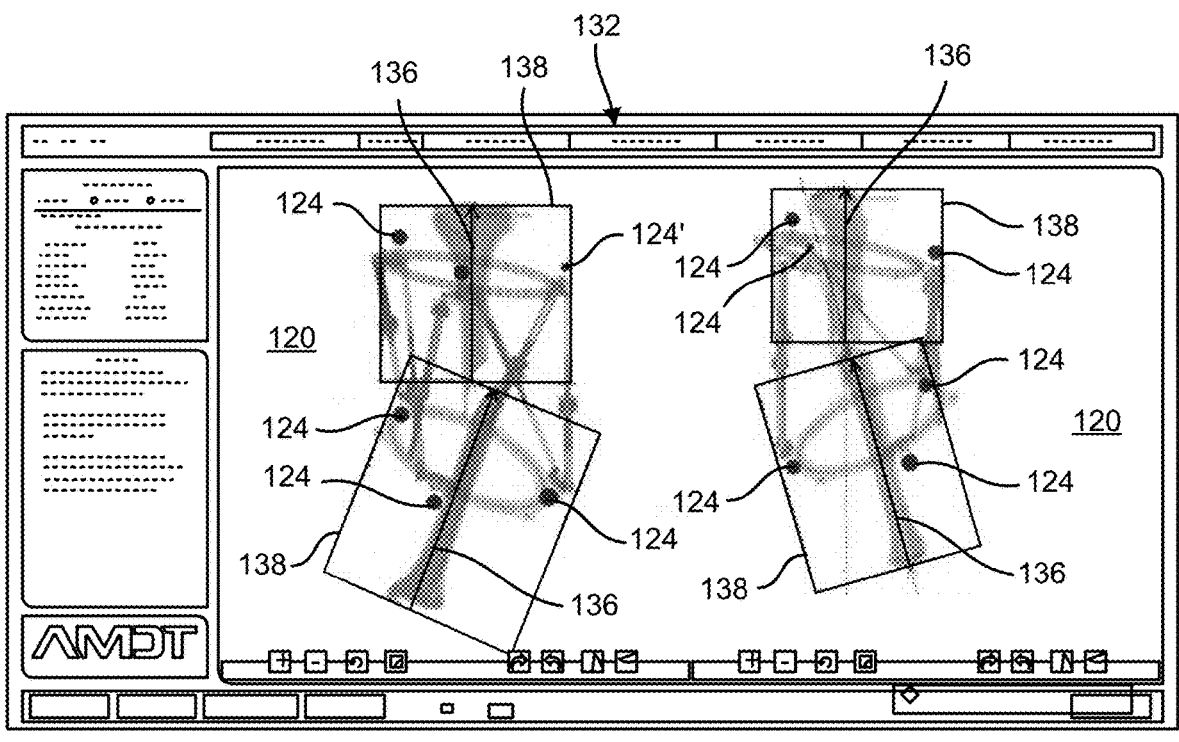
FIG. 7 is a screen shot illustrating an embodiment of a graphical user interface illustrating identified anatomical structure axes in the radiographic images of FIG. 5 according to the prescription determination method and system of FIG. 4.

As shown in FIG. 4, the methods and systems 100 may display or present the radiographic images 120 on the GUI 132 and allow the user to digitally identify an axis of the bone segments (or other anatomical structures of interest) in the radiographic images 120. For example, the methods and systems 100 may display the radiographic images 120 on the GUI 132 and allow the user to draw or form a line along the axes 136 of the bone segments in each radiographic image 120, as shown in FIGS. 4 and 7. The methods and systems 100 may display or present the radiographic images 120 on the GUI 132 and also allow the user to digitally identify a portion of the image adjacent the identified axes that includes the bone segments (or other anatomical structures of interest) in the radiographic images 120. For example, the methods and systems 100 may display the radiographic images 120 on the GUI 132 and allow the user to draw or form a window or defined space 138 extending from each indicated axes 136 that includes the portions of images 120 that include the bone segments, as shown in FIG. 7.

Figure 8A:
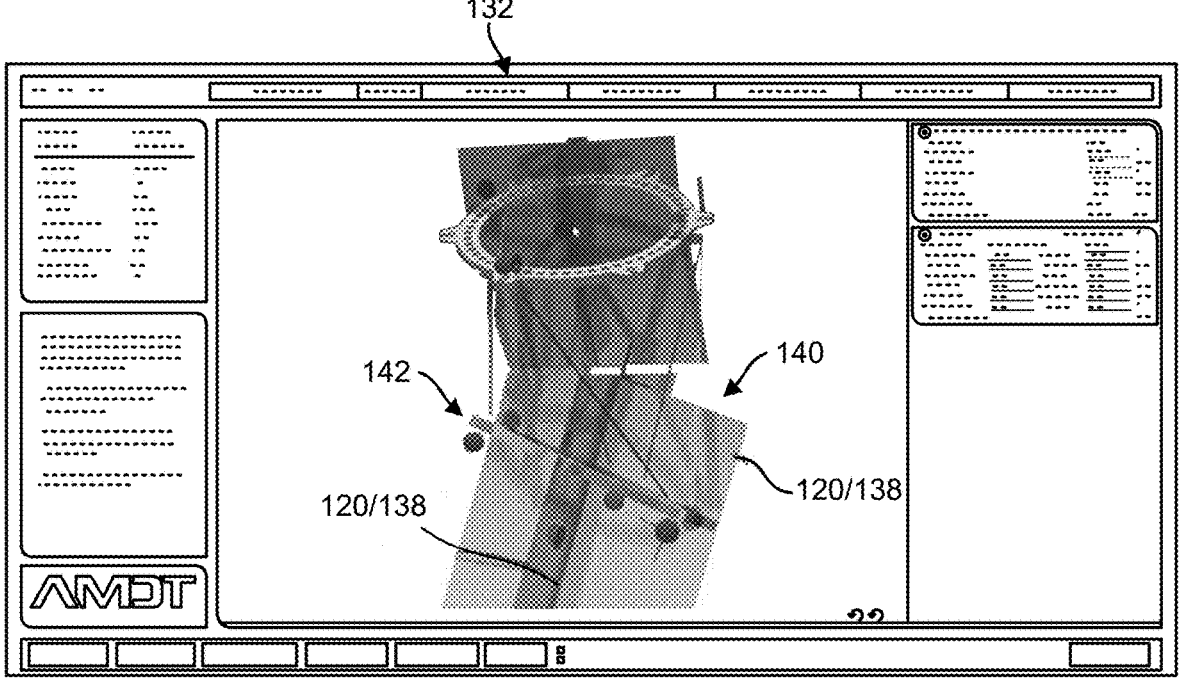
FIGS. 8A and 8B are screen shots illustrating embodiments of a graphical user interface illustrating a manipulatable three-dimensional model of an external fixation device and the anatomical structures in an initial arrangement formed from the radiographic images of FIG. 5 according to the prescription determination method and system of FIG. 4.
Figure 8B:
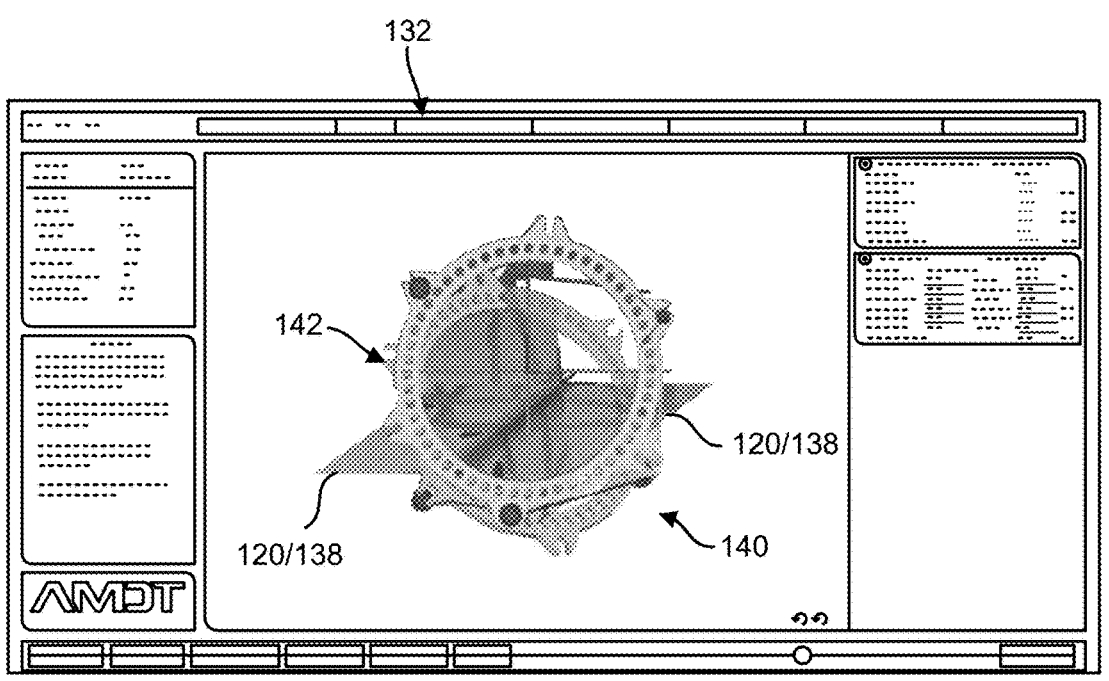

The axes 136 of the bone segments and selected portions 138 of the images 120 in each radiographic image 120 (and the selected portions of the radiographic image 120 including the bone segments) may be utilized by the methods and systems 100 to form a manipulatable three-dimensional model 140 illustrating the bone segments from the images 120 and a hexapod model 142, as shown in FIGS. 4, 8A and 8B. For example, the indicated axes 136 may represent planes extending normal to the radiographic image 120.

These planes for each bone segment may be intersected along a three-dimensional axis to arrange the selected portions of the radiographic images 120 into a three-dimensional model 140, as shown in FIGS. 8A and 8B. If the radiographic images 120 are orthogonal, the planes for each bone segment (and the respective selected portions of the radiographic images 120) may be intersected along the indicated axes 136 at ninety degrees to arrange the corresponding portions of the radiographic images 120 accordingly. However, as indicated above, the radiographic images 120 may not be orthogonal, and the methods and systems 100 may determine the difference in the vantage points/ orientations of the images 120. The methods and systems 100 may utilize the determined difference in the vantage points/orientations of the images 120 to intersect the planes accordingly (i.e., according to the "true" vantage points/ orientations of the images 120), and thereby the respective selected portions of the radiographic images 120 along the "true" three-dimensional axis for each bone segment. Further, as shown in FIGS. 4, 8A and 8B, the three-dimensional model 140 may include a model hexapod 142 corresponding to the expected hexapod as determined by the identified fiducials 124 in the radiographic images 120 as described above.

As shown in FIGS. 4, 8A and 8B, the three-dimensional model 140 may thereby be comprised of the three-dimensional bone segments formed by the intersecting selected portions 124 of the images 120 and the model hexapod 142 in the initial arrangement thereof as indicated in the images 120. The three-dimensional model 140 may be displayed on the GUI 132, and the user may be able to manipulate the three-dimensional bone segments along their corresponding three dimensional axes with respect to each other from the initial arrangement (along with the platforms of the model hexapod 142). For example, the methods and systems 100 may allow the user to utilize the GUI 120 to manipulate at least one of the three dimensional axes of the bone segments with respect to the other according to a pre-defined pathway or course into a desired three-dimensional arrangement of the bone segments, as shown in FIGS. 9A-C.

Figure 9A:
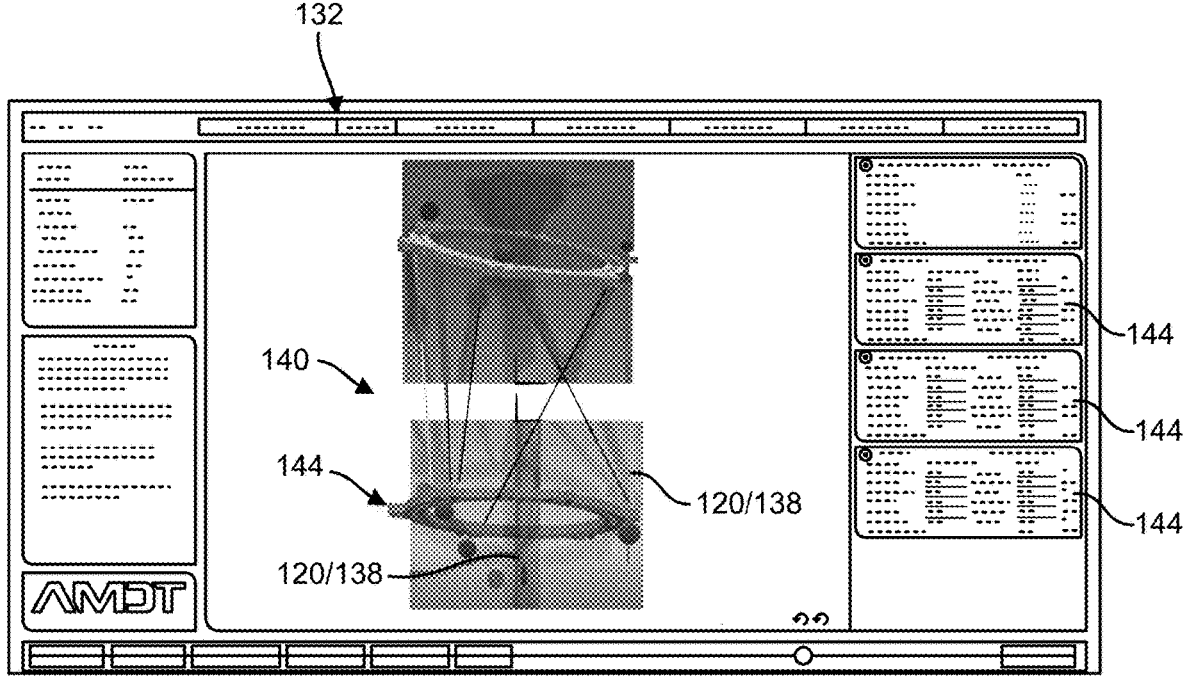
FIGS. 9A-9C are screen shots illustrating embodiments of a graphical user interface illustrating the three-dimensional model of FIGS. 8A and 8B after user manipulation thereof into a desired arrangement of the anatomical structures according to the prescription determination method and system of FIG. 4.
Figure 9B:
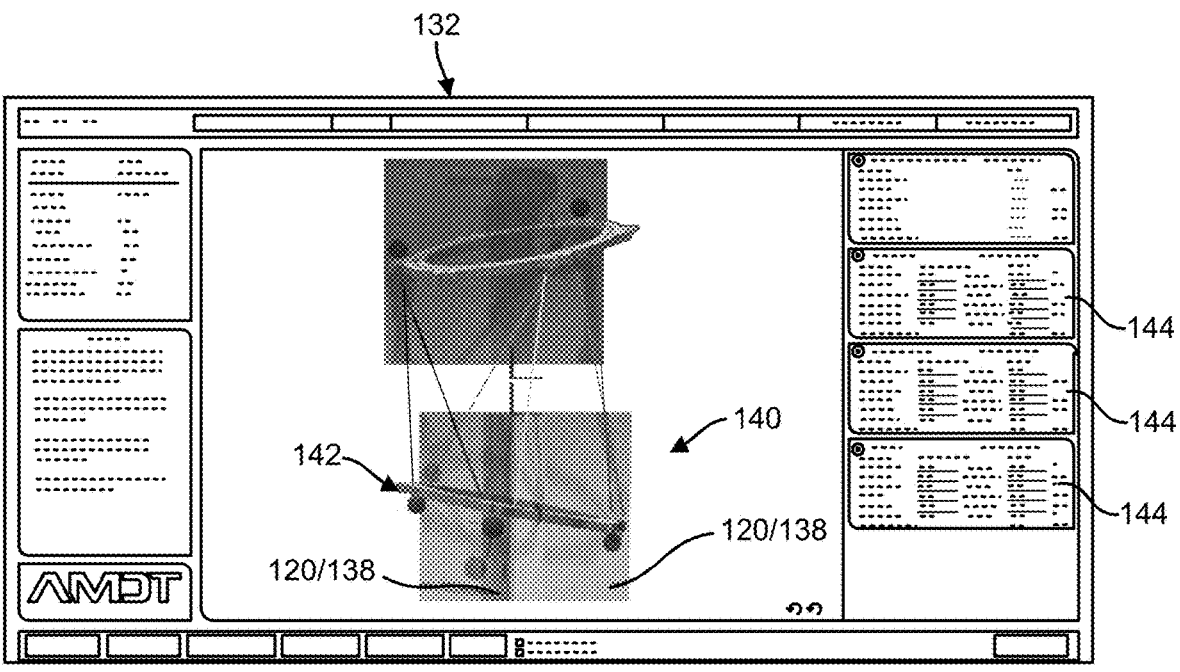
Figure 9C:
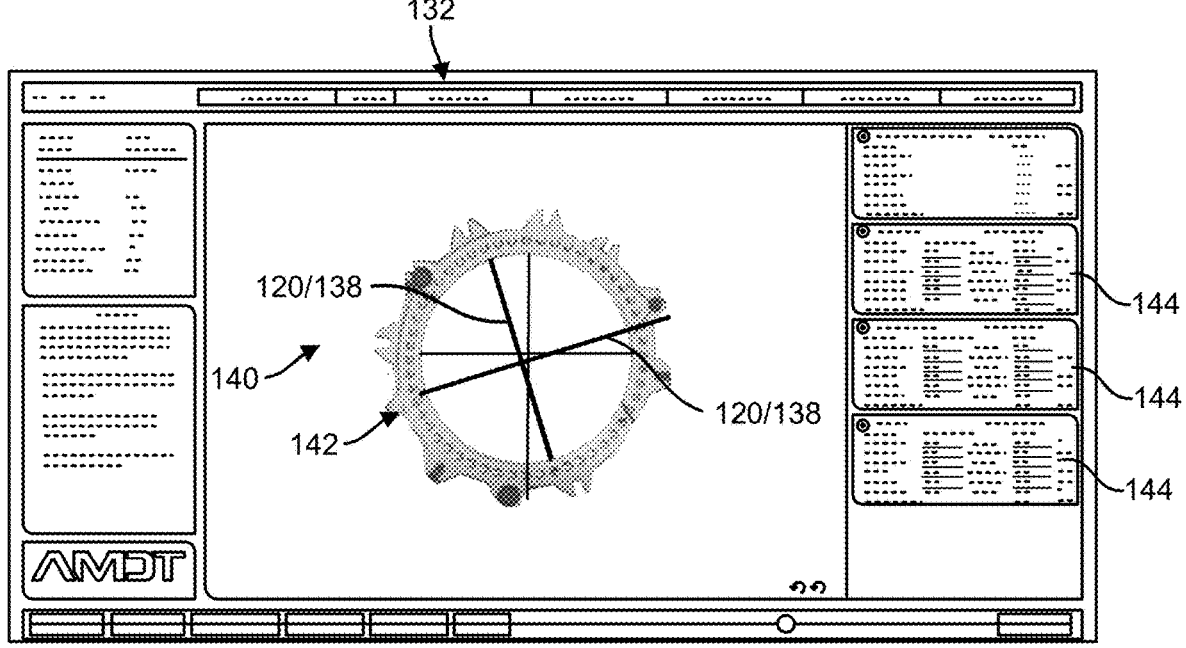

As shown in FIGS. 4 and 9A-C, the user may utilize the GUI 132 to manipulate the position and orientation of the bone segment models with respect to each other along user defined waypoints, segments or phases 144. For example, the user may utilize the GUI 132 to form a first manipulation phase 144 of the bone segment models (i.e., relative movement of their three-dimensional axes) that rearranges the bone segment models from the initial arrangement to a first user defined waypoint arrangement, as shown in FIGS. 9A-C. From the first user defined waypoint arrangement 144, the user may enter a second manipulation phase 144 of the bone segment models that rearranges the bone segment models from the first user defined waypoint arrangement to a second user defined waypoint arrangement, as shown in FIGS. 9A-C. Similarly, the user may then enter a third manipulation phase 144 of the bone segment models that rearranges the bone segment models from the second user defined waypoint arrangement to a third user defined waypoint arrangement. In this way, the user can determine the pathway or course of the movement of the bone segments from the initial arrangement to the desired arrangement.

Figure 10:
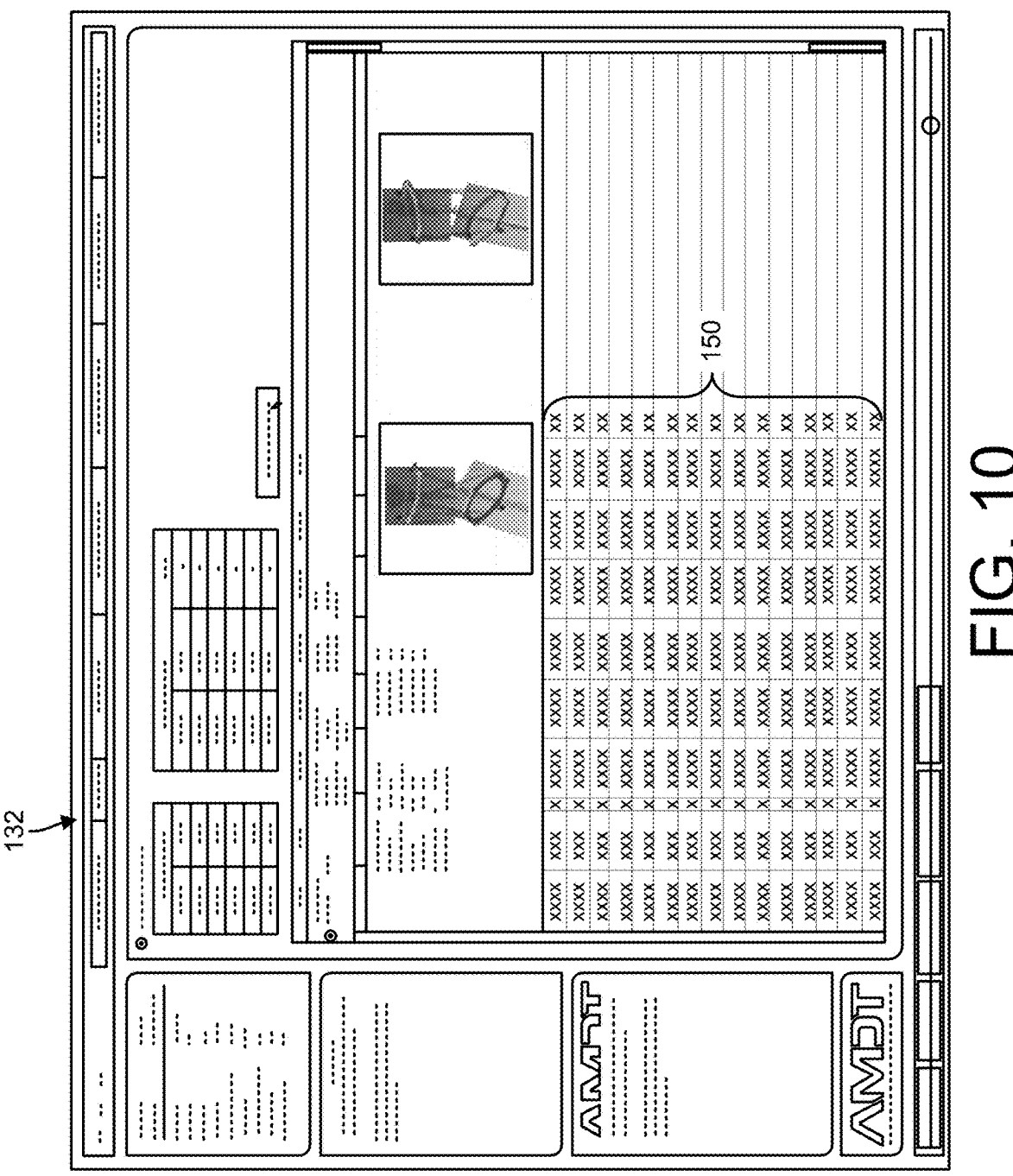
FIG. 10 is a screen shot illustrating an embodiment of a customized adjustment prescription for the external fixation device to manipulate the anatomical structures from the initial arrangement of FIGS. 8A and 8B to the desired arrangement of FIGS. 9A-9C.

As shown in FIGS. 8A-9C, the hexapod model 142 may correspondingly adjust to the relative rearrangement or movement of the bone segments models along the defined waypoints 144. In this way, the methods and systems 100 may calculate or determine the changes in strut lengths of the hexapod model as the bone segments, and the platforms affixed thereto, rearrange from the initial arrangement to the desired arrangement. As shown in FIG. 10, the methods and systems 100 may display on the GUI 132, display on another GUI or otherwise output (e.g., output to a physical form, computer memory, etc.) the adjustment prescription 150 (i.e., the incremental strut length adjustments, or instructions for effectuating such strut length adjustments) for the hexapod that effectuates movement of the bone segments from the initial arrangement to the desired arrangement along the defined waypoints or pathway 144. The user or patient may thereby incrementally adjust the struts of the actual hexapod on the patient according to the adjustment prescription 150 to move of the bone segments from the initial arrangement to the desired arrangement along the defined waypoints 144. In this way, the user or patient can utilize the adjustments provided by the adjustment prescription 150 to adjust the struts of the actual hexapod and move or manipulate the bone segments into the desired arrangement.

While the embodiments of the invention that have been specifically detailed here include hexapod type external fixation structures, it is important to note that the apparatuses and methods of the invention are applicable to many types of external fixation devices. Many variations of the hexapod or Stewart platform based external fixators are noted in the patents and documents incorporated by reference above. Apparatuses and methods of the invention are useful with any of these variations, including with external fixators that have only partial rings, reduced numbers of struts, or include clamp and bar structures built into or built separately from the external fixation device. Apparatuses and methods of the invention are equally useful in configuring unilateral ortho-paedic external fixation device, such unilateral devices disclosed in U.S. Pat. No. 5,702,389. The illustrated devices also incorporate a six strut Stewart platform. However, a unilateral orthopaedic external fixation device within the claims of this invention would not necessarily include a Stewart platform. A device with the claims of this invention may merely include a combination of adjustments that allow the device to mimic some or all of the degrees of translation and rotation of the devices detailed above.

In some embodiments of the method and system, the identified digital fiducials of the hexapod in each radiographic image may be adjusted before the creation of the three-dimensional model to provide a more accurate representation of the arrangement of the hexapod and the bone segments, and thereby a more accurate and effective correction prescription. Specifically, correcting for distortion of the fiducials within each radiographic image may provide a more accurate three-dimensional model of the hexapod and bone segments (which is utilized by a user to determine the correction prescription, as described above).

As noted above, the method and system may utilize two digital radiographic images taken from a radiography machine of differing orientations, or taken from different relative vantagepoints, of the hexapod external fixation device affixed to the patient. To create the images, a typical radiography machine produces a beam of X-rays (or other form of electromagnetic radiation) via a generator that is projected toward the hexapod affixed to a bone segments of a patient. A certain amount of X-rays are absorbed by the hexapod and patient, dependent upon the density and composition thereof. X-rays that pass through the hexapod and patient are captured behind the hexapod and patient by a detector (e.g., a photographic film or a digital detector). The detected X-rays are then displayed as an image indicating the relative amounts of detected X-rays. The generation of this flat two-dimensional image by this technique is often referred to as projectional radiography.

Figure 11:
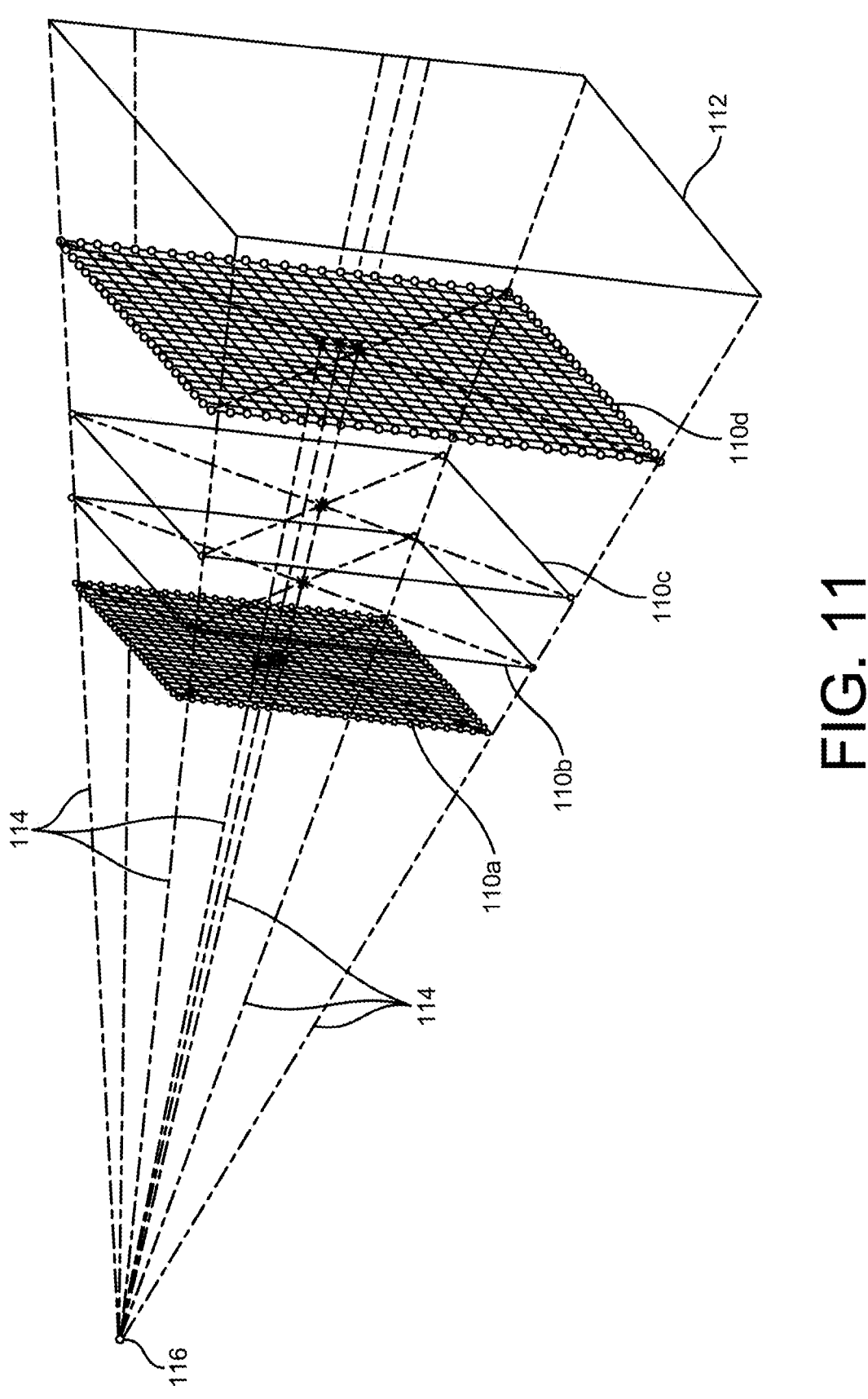
FIG. 11 illustrates a mode of distortion of artifacts in radiographic images based on relative position with respect to a radiographic detector.

However, projectional radiography typically produces an image that has certain artifacts magnified in both size and location relative to the image center. The magnitude of this magnification may be a linear function of the artifacts distance from the detector as the x-rays may be emitted from a generation focal point or area. As shown in FIG. 11, artifacts 110a, 110b that are positioned further from the detector 112 are magnified greater than artifacts 110c, 110d, that are positioned relatively closer to the detector 112 due to the divergence of the x-rays 114 from the generation point/area 116. In this way, the artifacts 110a, 110b that are positioned further from the detector 112 cast a larger shadow of absorbed x-rays at the detector 112 114 (and thereby less detected x-rays 114) than as compared to that of the artifacts 110c, 110d, that are positioned relatively closer to the detector 112.

As discussed above, in some embodiments the method and system may be configured to produce a correction prescription for a hexapod external fixation device that includes an array of a plurality of spherical fiducials (e.g., six total fiducials, with three fiducials coupled to each platform) that are arrayed about the bone segments and other anatomy of the patient. When imaged via projectional radiography to produce the radiographic images, since each fiducial marker is located at a different position, the distance from the x-ray detector will be different for each fiducial and thus the magnification will be different on an individual basis than the magnification of the anatomy of interest (i.e., the bone segments). To account for such difference in magnification of the fiducials and the anatomy of the patient (in particular, the bone segments), the method and system may perform a distortion correction scheme that modifies the radiographic images and the position and size of the identified fiducials to, ultimately, produce a correction prescription that more accurately results in the desired placement of the bone segments (via the three-dimensional model of the hexapod and bone segments).

Figure 13:
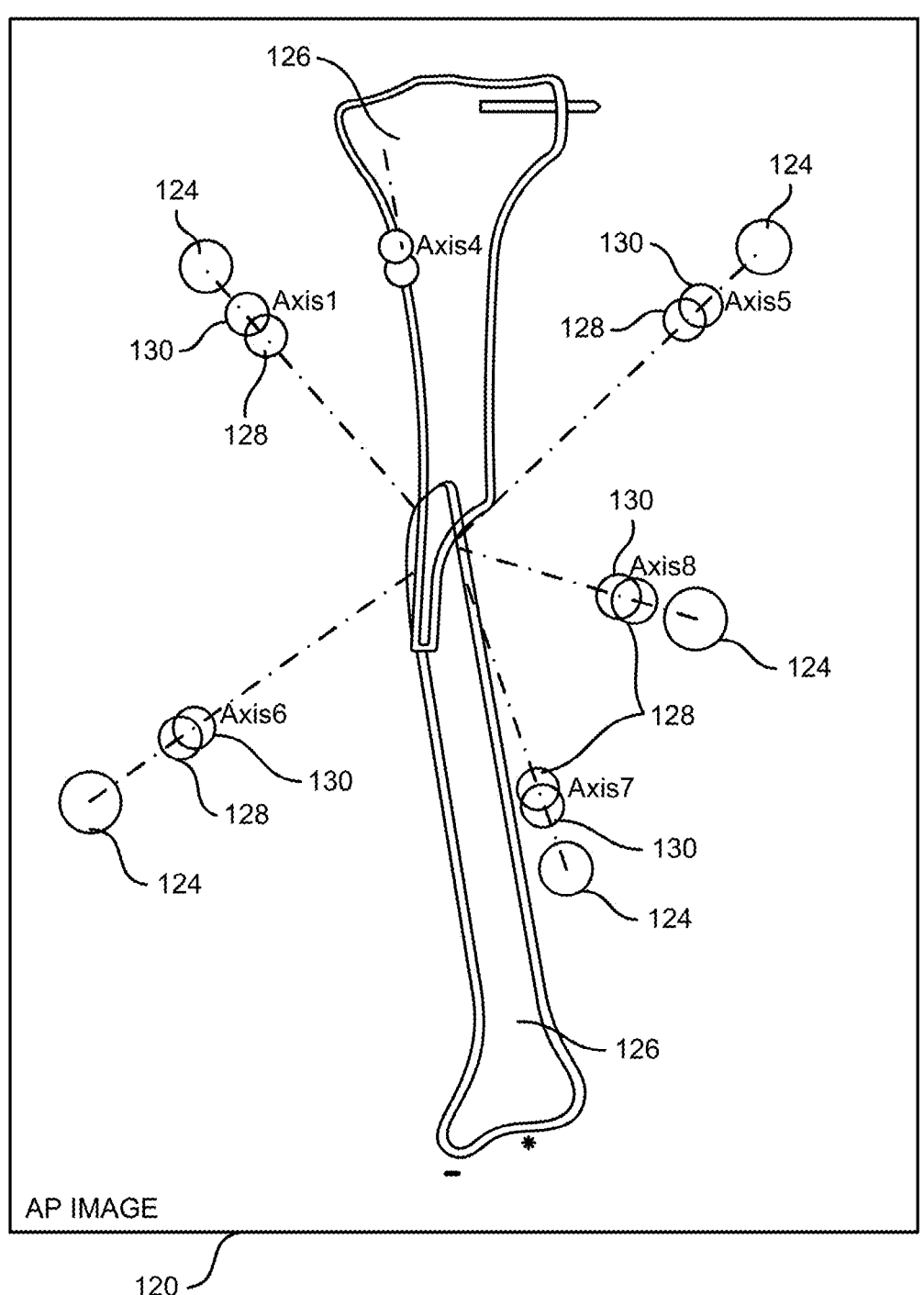
FIG. 13 illustrates a radiographic image including identified and corrected fiducials of an exemplary hexapod external fixation device affixed to exemplary bone segments according to the present disclosure.
Figure 14:
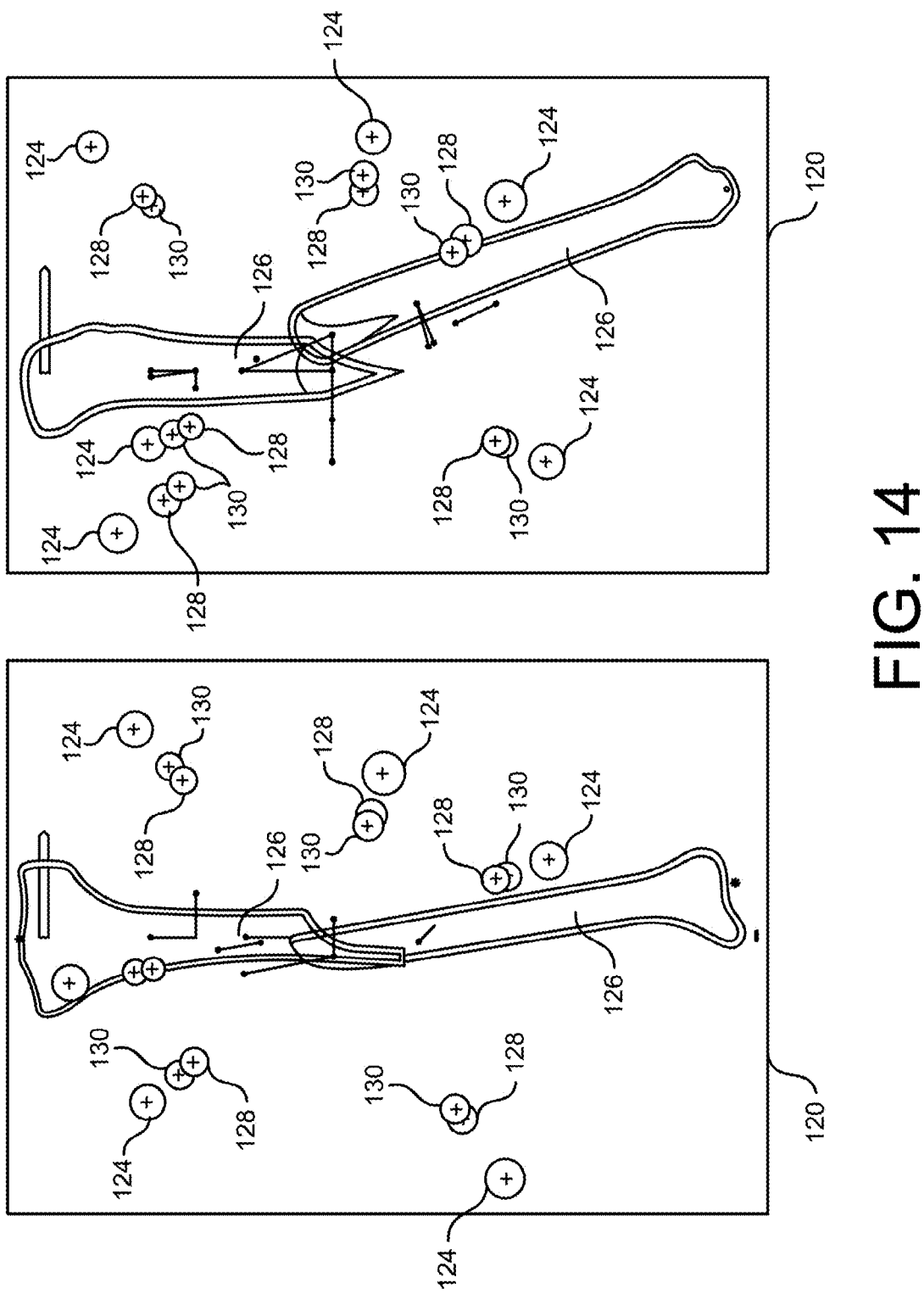
FIG. 14 illustrates a pair of radiographic images including identified and corrected fiducials of an exemplary hexapod external fixation device affixed to exemplary bone segments according to the present disclosure.
Figure 15:
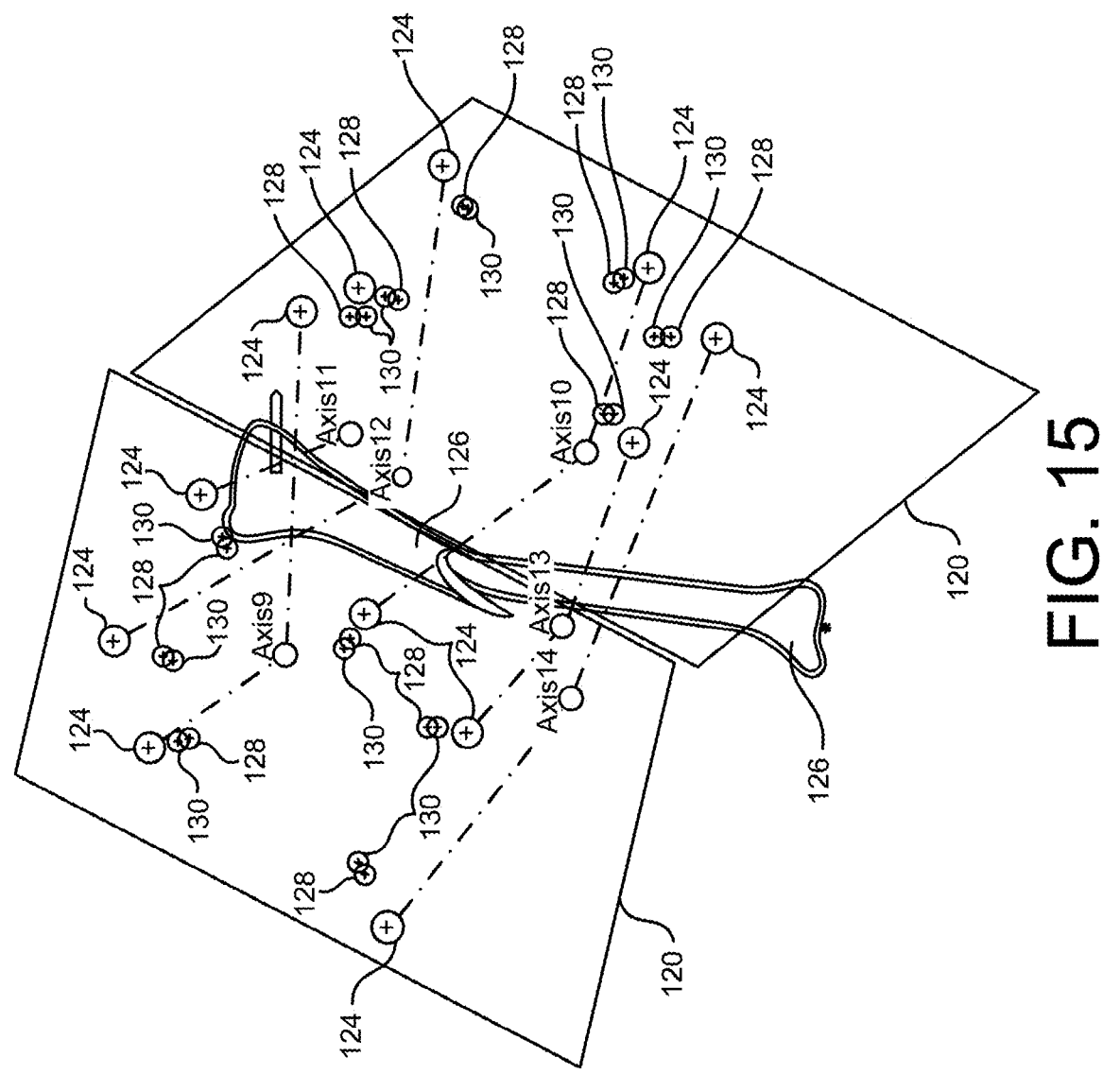
FIG. 15 illustrates the formation of an exemplary three-dimensional model with the pair of radiographic images of FIG. 13 according to the present disclosure.

As shown in FIGS. 12-15, in some embodiments the method and system may employ a distortion correction scheme 200 that accounts for the volumetric distortion of each radiographic image as a whole and/or fiducial-specific size and position distortion. In some embodiments, the method and system may modify the radiographic images to account for volumetric distortion thereof by recognizing that a comparison of a summation of a dimension of the identified fiducials with the expected or actual summation of the fiducial diameters will arrive at a bulk or volume magnification that will relatively closely correspond to the magnification of the bone segments (i.e., the surrounded anatomy of interest). For example, as shown in FIGS. 12-15, in some embodiments the distortion correction scheme 200 may modify each radiographic image 120 to account for the volumetric distortion thereof, and thereby, the bone segments 126 (and/or other anatomy of interest) by determining 222 the ratio of the summation of the discovered fiducial markers 124 in the radiographic image 120 in pixels to the expected summation of a dimension of the actual fiducial markers of the hexapod affixed to the patient in some unit of measure (e.g., inches, millimeters, etc.) to determine the volumetric scale of the image in pixels per unit of fiducial measure. In some embodiments, such as when the actual fiducial markers are substantially spherical, a diameter of the fiducials may be summed and compared. It is noted that the identified fiducial markers 124 in the radiographic image 120 may be at least substantially elliptical in shape due to the divergent nature of the x-rays, as shown in FIGS. 13 and 15. In such an embodiment, the minor axes of the identified fiducial markers 124 in the radiographic image 120 in pixels may be summed and compared to the expected summation of the diameters of the actual fiducial markers of the hexapod to determine 122 the ratio thereof.

As shown in FIG. 12, the distortion correction scheme 200 may also determine 224 the ratio of the pixels per fiducial unit of measure to the expected resolution in pixels per image unit of measure of the radiographic image 120. The expected image resolution in pixels per image unit of measure may be determined by the parameters contained within the digital file of the images. As also shown in FIG. 12, the distortion correction scheme 200 may then include determining 226 the volumetric scale of the radiographic image 120, and thereby the volumetric scale bone segments 126 (and/or other anatomy of interest). Determining 226 the volumetric scale of the radiographic image 120 may comprise determining the ration of the volumetric scale of the image in pixels per unit of fiducial measure to the ratio of the pixels per fiducial unit of measure to the expected resolution in pixels per image unit of measure of the radiographic image 120 (i.e., dividing the ratio of the pixels per fiducial unit of measure to the expected resolution in pixels per image unit of measure of the radiographic image 120 into the metric scale of the image in pixels per unit of fiducial measure).

The distortion correction scheme 200 may utilize the volumetric scale of the radiographic image 120 to scale 228 the radiographic image 120 accordingly. For example, the entire radiographic image 120 may be scaled 228 in accordance with the computed volumetric scale from the center of the image 120. Scaling 228 the radiographic image 120 according to the volumetric scale will thereby either shrink or expand the entire radiographic image 120, and the initially identified fiducials 124 will move from their distorted positions to scaled positions as volume scaled fiducials 128, as shown in FIGS. 13-15. Further, all other artifacts of the radiographic image 120 will also be moved or relocated based on the shrinkage or expansion of the image 120 according to the volumetric scale. This volumetric scale determination process may be repeated for each image 120. In this way, for example, the method and system may employ a distortion correction scheme 200 that accounts for the volumetric distortion of each radiographic image 120, as a whole.

As noted above and shown in FIGS. 13-15, in some embodiments the method and system may employ a distortion correction scheme 200 that accounts for fiducial-specific size and position distortion (potentially in addition to accounting for the volumetric distortion of each radiographic image as a whole as discussed above). In some embodiments, the method and system may modify the size and position of the identified fiducials 124 individually or specifically as each fiducial of the hexapod was positioned as unique position and distance relative to the x-ray detector, and thereby was distorted differently. As shown in FIGS. 12-15, the distortion correction scheme 200 may account for fiducial-specific size and position distortion by determining 230 an individual fiducial ratio of an expected fiducial dimension (i.e., an actual dimension of the physical fiducial marker of the hexapod) to the dimension of the corresponding volume scaled fiducial 128 on an individual basis (i.e., an individual fiducial ratio of the expected fiducial dimension to the dimension in the corresponding volume scaled fiducial 128). As noted above, the actual fiducials of the hexapod may be spherical, and the volume scaled fiducials

128 may be elliptical. In such embodiments, the individual fiducial ratios may be determined 230 by dividing the expected fiducial diameter to the diameter (e.g., the minor diameter if non-circular) of the corresponding volume scaled fiducial 128.

With the individual fiducial ratios determined, the distortion correction scheme 200 may utilize 232 the individual ratios to create new digital or graphic individually scaled fiducial markers 130 for each fiducial that are in a specifically scaled positions and of the expected fiducial diameter (i.e., the actual diameter of the corresponding physical fiducial marker of the hexapod), as shown in FIGS. 12-15. For example, digital individually scaled fiducial circles or markers 130 corresponding to the actual diameter of each fiducial of the hexapod may be formed on the radiographic image 120. The individually scaled fiducial markers or circles 130 may be positioned relative to the volume scaled fiducial 128 based on the individual fiducial ratios, as shown in FIGS. 13-15. For example, the individually scaled fiducial markers 130 may be radially moved or positioned from the center of the volume scaled fiducials 128 closer to, or further away, from the focal point or center of the radiographic image 120 based on the individual fiducial ratios, as shown in FIGS. 13-15. The focal point or center of the radiographic image 120 may be determined or approximated. For example, the focal point or center of the radiographic image 120 may be the mathematical center of the radiographic image 120 (i.e., the center of the x and y dimensions/directions of the image 120). As another example, the focal point or center of the radiographic image 120 may be determined via the volume scaled fiducials 128. In some such embodiments, the volume scaled fiducials 128 in the radiographic image 120 may be elliptical, and the major axis of the volume scaled fiducials 128 may be extended to their point of intersection, which may represent the focal point or center of the radiographic image 120. However, any other method of identifying the focal point or center of the radiographic image 120 may be utilized.

The individually scaled fiducial markers 130 may be radially moved or positioned along a direction extending between the center of the volume scaled fiducials 128 and the focal point or center of the radiographic image 120 distances based on the positions of the center of the volume scaled fiducials 128 and the individual fiducial ratios, as shown in FIGS. 13-15. For example, if an individual fiducial ratio is less than 1.0, the center of the corresponding individually scaled fiducial marker 130 may be positioned on the radiographic image 120 along the radial direction extending between the focal point or center of the radiographic image 120 and the center of the volume scaled fiducials 128 (see FIG. 13) closer towards the image center according to the individual fiducial ratio, as shown in FIGS. 12-14. In such a scenario, the center of the corresponding individually scaled fiducial marker 130 may be positioned a distance from the focal point or center of the radiographic image 120, along the radial direction extending between the focal point or center of the radiographic image 120 and the center of the corresponding volume scaled fiducial 128 (see FIG. 13), equal to the radial distance between the of the focal point or center of the radiographic image 120 and the center of the corresponding volume scaled fiducial 128 multiplied by the corresponding individual fiducial ratio (which would thereby be less than the radial distance between the focal point or center of the radiographic image 120 and the center of the corresponding volume scaled fiducial 128), as shown in FIGS. 13-15. Similarly, if an individual fiducial ratio is greater than 1.0, the center of the corresponding individually scaled fiducial marker 130 may be positioned on the radiographic image 120 along the radial direction extending between the focal point or center of the radiographic image 120 and the center of the corresponding volume scaled fiducial 128 (see FIG. 13) further away from the image center according to the individual fiducial ratio, as shown in FIGS. 13-15. In this way, in such a scenario the center of the corresponding individually scaled fiducial marker 130 may be positioned a distance from the focal point or center of the radiographic image 120, along the radial direction extending between the focal point or center of the radiographic image 120 and the center of the corresponding volume scaled fiducials 128 (see FIG. 13), equal to the radial distance between the focal point or center of the radiographic image 120 and the center of the corresponding volume scaled fiducial 128 multiplied by the corresponding individual fiducial ratio (which would thereby be greater than the radial distance between the focal point or center of the radiographic image 120 and the center of the corresponding volume scaled fiducial 128), as shown in FIGS. 13-15.

The individually scaled fiducial marker 130 may be formed via this process for each radiographic image 120, as shown in FIGS. 14 and 15. With the individual fiducial ratios determined, the distortion correction scheme 200 may thereby result in individually scaled fiducial markers 130 positioned in rectilinear coordinates (e.g., x and y coordinates) in each radiographic image 120 as if the x-ray generator utilized to create the radiographic image 120 was at infinity (as opposed to some finite distance away from the detector). As shown in FIG. 15, the radiographic images 120 with the individually scaled fiducial marker 130 and the volume scaled bone segments and/or other anatomy of interest may be combined to compute the actual coordinates of the fiducials of the hexapod on the patient, and form the three-dimensional model of the hexapod and bone segments and/or other anatomy of interest, which can be utilized to determine the correction prescription as discussed above.

As would be evident to one of ordinary skill in the art, the inventions of this disclosure provide significant improvements in the field of external fixation device and anatomical structure computer modeling, including the field of hexapod and bone segment modeling. Further, the inventions of this disclosure provide significant improvements in the field of radiographic imaging, including the field of distortion correction of radiographic images. The inventions of this disclosure also provide significant improvements in the field of external fixation device adjustment prescription determination, including the field of hexapod adjustment prescriptions.

Those having ordinary skill in the art will recognize that aspects of the present invention may be embodied in system(s), method(s) and/or computer program product(s). In some embodiments, aspects of the present invention may be embodied entirely in hardware, entirely in software (for instance in firmware, resident software, micro-code, etc.), or in a combination of software and hardware aspects that may all generally be referred to herein as a "system" and include circuit(s) and/or module(s).

Figure 16:
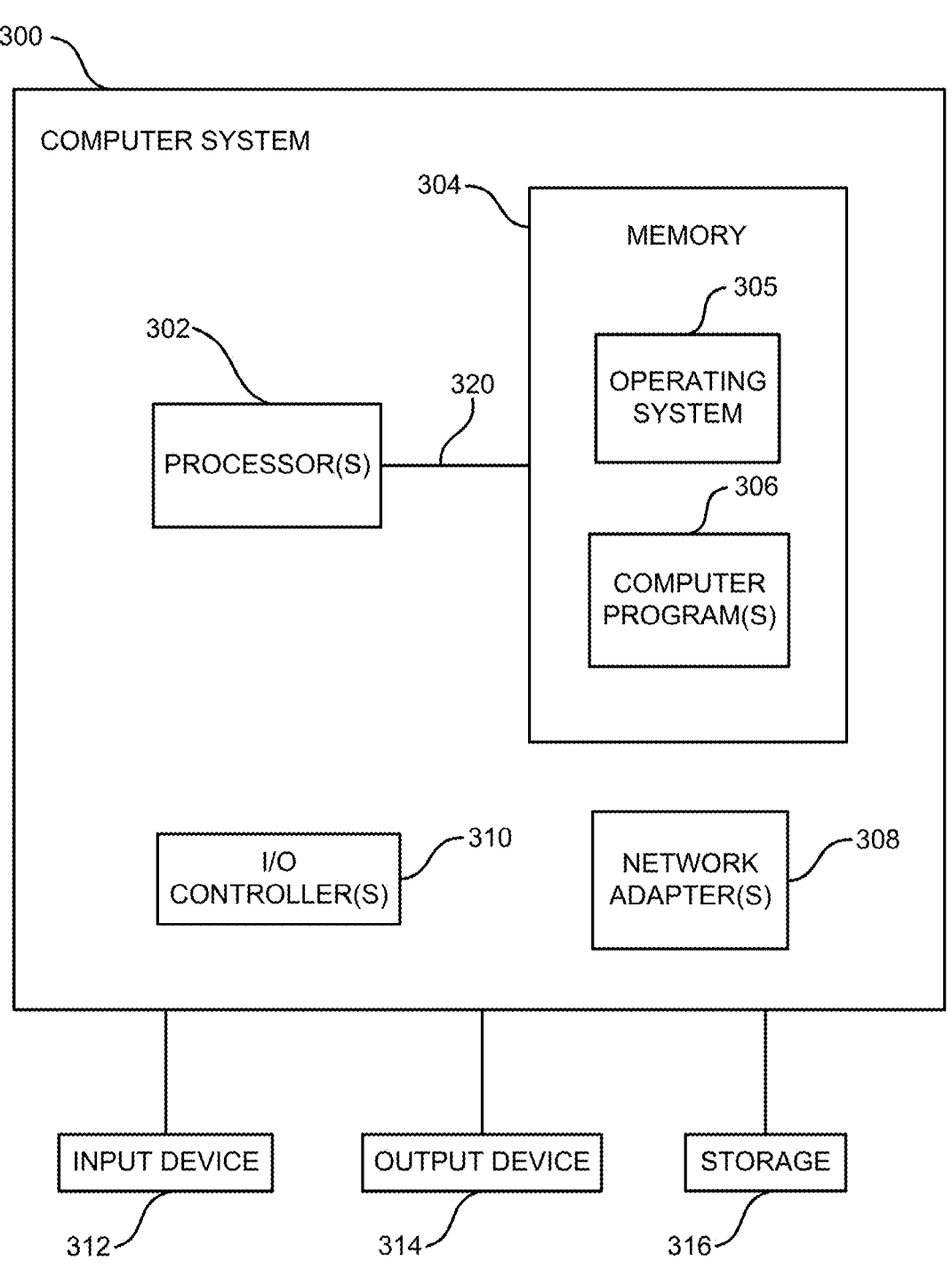
FIG. 16 depicts an exemplary computer system that may be utilized to generate an external fixation device adjustment prescription according to the present disclosure.

FIG. 16 depicts one example of a computer system to incorporate and use one or more aspects of the present invention. Computer system 300 may be a computer system of an article manufacturing and/or repair facility, such as a computer system used to additively manufacture articles, and/or a computer system for producing data used by an AM apparatus or device to fabricate articles. Computer system 300 of FIG. 7 may be suitable for storing and/or executing program code, such as program code for performing processes described above and includes at least one processor 302 coupled directly or indirectly to memory 304 through, a bus 320. In operation, processor(s) 302 may obtain from memory 304 instructions for execution by the processor(s). Memory 304 may include local memory employed during actual execution of the program code, bulk storage, and cache memories which provide temporary storage of at least some program code in order to reduce the number of times code must be retrieved from bulk storage during program code execution. A non-limiting list of examples of memory 304 includes a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 304 may include an operating system 305 and one or more computer programs 306, such as one or more programs for execution to perform aspects described herein, such as effecting adjustments to a digital layout of a circuit design.

Input/Output (I/O) devices 312, 314 (such as peripheral devices) may be coupled to the system either directly or through I/O controllers 310. Network adapters 308 may also be coupled to the system to enable the computer system to become coupled to other computer systems through intervening private or public networks. Modems, cable modem and Ethernet cards are just a few of the currently available types of network adapters 308. In one example, network adapters 308 facilitate obtaining data from remote sources to facilitate aspects of the present invention.

Computer system 300 may be coupled to storage 316 (e.g., a non-volatile storage area, such as magnetic disk drives, optical disk drives, a tape drive, etc.), having one or more databases. Storage 316 may include an internal storage device or an attached or network accessible storage. Computer programs in storage 316 may be loaded into memory 304 and executed by a processor 302.

The computer system 300 may include fewer components than illustrated, additional components not illustrated herein, or some combination of the components illustrated and additional components. Computer system 300 may include any computing device, such as a mainframe, server, personal computer, workstation, laptop, handheld computer, smartphone, table, or other mobile device, telephony device, network appliance, virtualization device, storage controller, etc.

In addition, processes described above may be performed by multiple computer systems 300, working in concert as part of a computing environment.

In some embodiments, aspects of the present invention may take the form of a computer program product embodied in computer readable medium(s). The computer readable medium(s) may have embodied thereon computer readable program code. Various computer readable medium(s) or combinations thereof may be utilized. For instance, the computer readable medium(s) may include a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to include a tangible medium that can contain or store program code for use by or in connection with an instruction execution system, apparatus, or device, such as a processor. The program code stored in/on the computer readable medium therefore produces an article of manufacture (such as a "computer program product") including program code.

Figure 17:
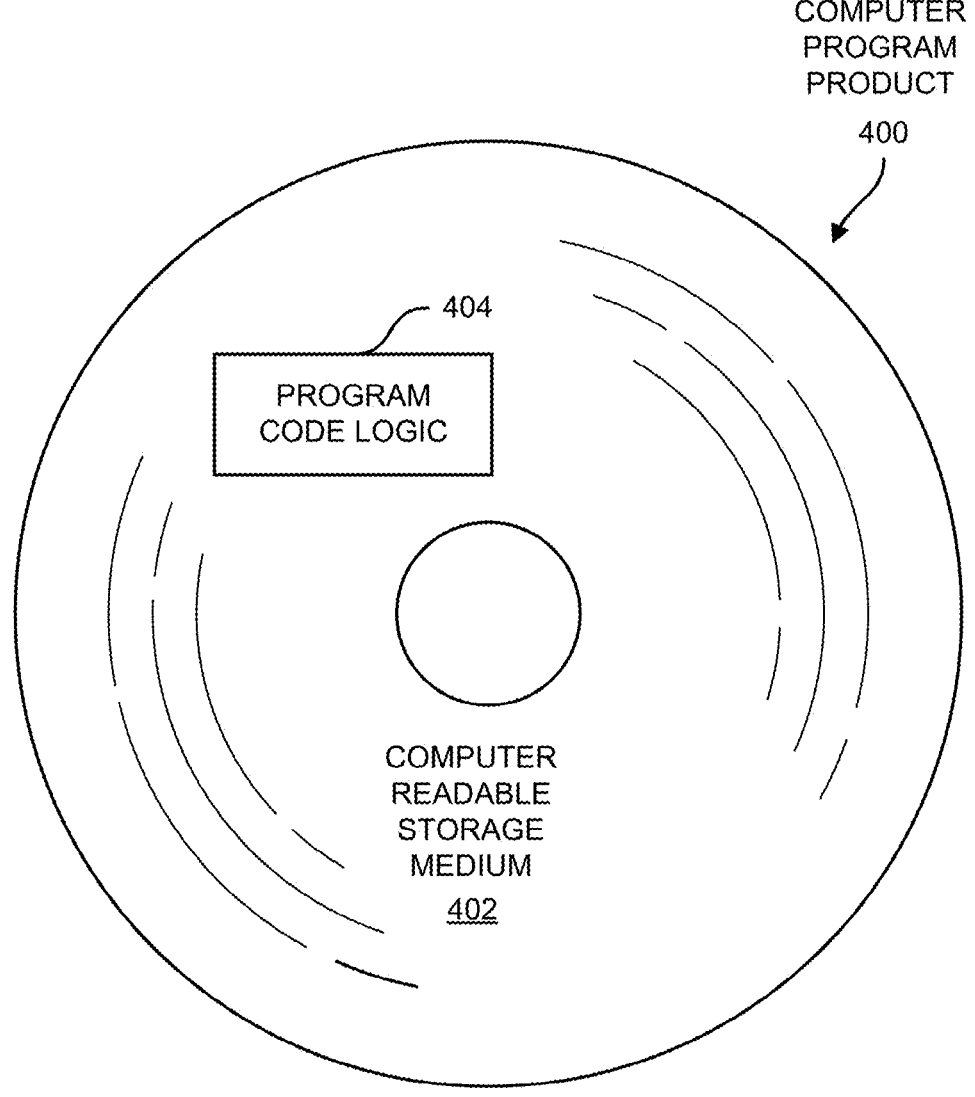
FIG. 17 depicts an embodiment of a computer program product that may incorporate aspects of the disclosure described herein.

Referring now to FIG. 17, in one example, a computer program product 400 includes, for instance, one or more computer readable media 402 to store computer readable program code means or logic 404 thereon to provide and facilitate one or more aspects of the present invention.

Program code contained or stored in/on a computer readable medium can be obtained and executed by a computer system (computer, computer system, etc. including a component thereof) and/or other devices to cause the computer system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects of the present invention may be written in one or more programming languages. In some embodiments, the programming language(s) include object-oriented and/or procedural programming languages such as C, C++, C#, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained for execution by one or more processors. Computer program instructions may be provided to one or more processors of, e.g., one or more computer system, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the figures illustrate the architecture, functionality, and operation of possible embodiments of systems, methods and/or computer program products according to aspects of the present invention. These flowchart illustrations and/or block diagrams could, therefore, be of methods, apparatuses (systems), and/or computer program products according to aspects of the present invention.

In some embodiments, as noted above, each block in a flowchart or block diagram may represent a module, segment, or portion of code, which includes one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably connected" is used herein to refer to both connections resulting from separate, distinct components being directly or indirectly coupled and components being integrally formed (i.e., monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A method of determining an adjustment prescription of an external fixation device affixed to anatomical structures comprising bone segments, comprising:

obtaining at least two digital radiographic images of differing orientations of the external fixation device and anatomical structures in an initial arrangement;

identifying fiducial markers of the external fixation device in the at least two radiographic images, wherein identifying fiducial markers of the external fixation device in the at least two radiographic images comprises creating individually scaled digital fiducial markers for each fiducial in the radiographic images by correcting distortion of the radiographic images, wherein correcting distortion of the radiographic images comprises:

determining a first ratio of the summation of the fiducial markers in the radiographic image in pixels the expected summation of a dimension of the actual fiducial markers of the external device to determine a volumetric scale of the radiographic image in pixels per unit of fiducial measure;

determining a second ratio of the pixels per fiducial unit of measure to the expected resolution in pixels per image unit of measure of the radiographic image;

adjusting the volumetric scale of the radiographic image based on the second ratio generating an adjusted volumetric scale;

scaling the radiographic image in accordance with the adjusted volumetric scale generating volume-scaled identified fiducials;

determining individual ratios of dimensions of e volume-scaled identified fiducials to the expected fiducial dimension on an individual fiducial basis; and utilizing the individual ratios to create the individually scaled digital fiducial markers for each fiducial on the radiographic image;

identifying an axis of the anatomical structures in the at least two radiographic images;

providing a virtual manipulatable three-dimensional model of the external fixation device and the anatomical structures from the identified fiducial markers, the at least two radiographic images and the identified axis of the anatomical structures;

receiving a correction input via the three-dimensional model defining a user determined desired arrangement of the three-dimensional model of the bone segments of the anatomical structures;

receiving a waypoint input defining at least one user selected waypoint that defines an intermediate arrangement of the anatomical structures, wherein the intermediate arrangement of the anatomical structures defines a pathway of the movement of the anatomical structures between the initial arrangement and the user determined desired arrangement; and providing an adjustment prescription of strut assemblies of the external fixation device based on the user determined desired arrangement of the anatomical structures that rearranges the anatomical structures from the initial arrangement to the desired arrangement via the at least one user selected waypoint, wherein the user determined desired arrangement of the anatomical structures is determined via the three-dimensional model.

2. The method of claim 1, wherein the external fixation device is a hexapod type external fixation device.

3. The method of claim 1, wherein the method is implemented in a computer system.

4. The method of claim 1, wherein the pathway of the movement of the anatomical structures is defined by a plurality of waypoints as a plurality of waypoint inputs.

5. The method of claim 1, wherein the anatomical structures are represented by bone segment models and the user defined waypoint identifies the position and orientation of the bone segment models with respect to each other between the initial arrangement and the desired arrangement.

6. A computer system configured to perform a method, the method comprising:

correcting distortion of a radiographic image of a plurality of fiducial markers of an external fixation device and anatomical structures, comprising:

analyzing the radiographic image to identify the fiducial markers;

determining a calculated summation of a dimension of the fiducial markers identified;

determining a first ratio of the calculated summation of the fiducial markers in the radiographic image in pixels to an expected summation of a corresponding expected fiducial dimension of the actual fiducial markers of the external fixation device to determine a volumetric scale of the radiographic image in pixels per unit of fiducial measure;

determining a second ratio of the pixels per fiducial unit of measure to an expected resolution in pixels per image unit of measure of the radiographic image;

adjusting the volumetric scale of the radiographic image based on the second ratio generating an adjusted volumetric scale;

scaling the radiographic image in accordance with the adjusted volumetric scale generating volume-scaled identified fiducials;

determining individual ratios of dimensions of the volume-scaled identified fiducials to the expected fiducial dimension on an individual fiducial basis; and utilizing the individual ratios of each of the fiducial markers to generate individually scaled digital fiducial markers for each of the fiducial markers identified.

7. A method of correcting distortion of a radiographic image of a plurality of fiducial markers of an external fixation device and anatomical structures, comprising:

analyzing the radiographic image to identify the fiducial markers;

determining a calculated summation of a dimension of the fiducial markers identified;

determining a first ratio of the calculated summation of the fiducial markers in the radiographic image in pixels to an expected summation of a corresponding expected fiducial dimension of actual fiducial markers of the external fixation device to determine a volumetric scale the radiographic image in pixels per unit of fiducial measure;

determining a second ratio of the pixels per fiducial unit of measure to an expected resolution in pixels per unit of measure of the radiographic image;

adjusting the volumetric scale of the radiographic image based on the second ratio generating an adjusted volumetric scale;

scaling the radiographic image in accordance with the adjusted volumetric scale generating volume-scaled identified fiducials;

determining individual ratios of dimensions of the volume-scaled identified fiducials to the expected fiducial dimension on an individual fiducial basis; and utilizing the individual ratios of each of the fiducial markers to generate individually scaled digital fiducial markers for each of the fiducial markers identified.

8. The method of claim 7, wherein the method is implemented in a computer system.

9. A computer program product comprising:

a non-transitory computer readable storage medium storing instructions that, when executed by a processor, cause the processor to perform a method of correcting distortion of a radiographic image of a plurality of fiducial markers of an external fixation device and anatomical structures, the method comprising:

analyzing the radiographic image to identify the fiducial markers;

determining a calculated summation of a dimension of the fiducial markers identified;

determining a first ratio of the calculated summation of the fiducial markers in the radiographic image in pixels to an expected summation of a corresponding expected fiducial dimension of actual fiducial markers of the external fixation device to determine a volumetric scale of the radiographic image in pixels per unit of fiducial measure;

determining a second ratio of the pixels per fiducial unit of measure to an expected resolution in pixels per image unit of measure of radiographic image;

adjusting the volumetric scale of the radiographic image based on the second ratio generating an adjusted volumetric scale;

scaling the radiographic image in accordance with the adjusted volumetric scale generating volume-scaled identified fiducials;

determining individual ratios of dimensions of the volume-scaled identified fiducials to the expected fiducial dimension on an individual fiducial basis; and utilizing the individual ratios of each of the fiducial markers to generate individually scaled digital fiducial markers for each of the fiducial markers identified.

10. The method according to claim 6, wherein the scaling of the radiographic image moves the fiducial markers to scaled positions.

\* \* \* \* \*